(12) United States Patent
Ryu

(10) Patent No.: US 8,246,459 B2
(45) Date of Patent: Aug. 21, 2012

(54) METHOD, APPARATUS AND RECORDING MEDIUM FOR PERFORMANCE GAME

(75) Inventor: Hwi-Man Ryu, Anyang-si (KR)

(73) Assignee: Neowiz Games Co., Ltd., Seongnam-si, Gyeonggi-do (KR)

( * ) Notice: Subject to any disclaimer, the term of this patent is extended or adjusted under 35 U.S.C. 154(b) by 0 days.

(21) Appl. No.: 13/106,694

(22) Filed: May 12, 2011

(65) Prior Publication Data

US 2011/0281622 A1    Nov. 17, 2011

(30) Foreign Application Priority Data

May 13, 2010    (KR) .................. 10-2010-0044956

(51) Int. Cl.
*G06F 17/00*    (2006.01)

(52) U.S. Cl. ......................................................... 463/36
(58) Field of Classification Search ..................... 463/36
See application file for complete search history.

(56) References Cited

U.S. PATENT DOCUMENTS

| 6,464,585 B1 * | 10/2002 | Miyamoto et al. .............. 463/35 |
| 2008/0280680 A1 * | 11/2008 | Dutilly et al. ................... 463/36 |
| 2009/0312086 A1 * | 12/2009 | Kanellos et al. ................ 463/20 |
| 2010/0016079 A1 * | 1/2010 | Jessop .............................. 463/39 |

* cited by examiner

*Primary Examiner* — Masud Ahmed
(74) *Attorney, Agent, or Firm* — Lowe Hauptman Ham & Berner, LLP

(57) ABSTRACT

Disclosed are a method, an apparatus, and a recording medium for a performance game, and more particularly are a method, an apparatus, and a recording medium for providing a performance game for playing indicators in a plurality of areas while a user moves in corresponding areas.

20 Claims, 21 Drawing Sheets

FIG. 3
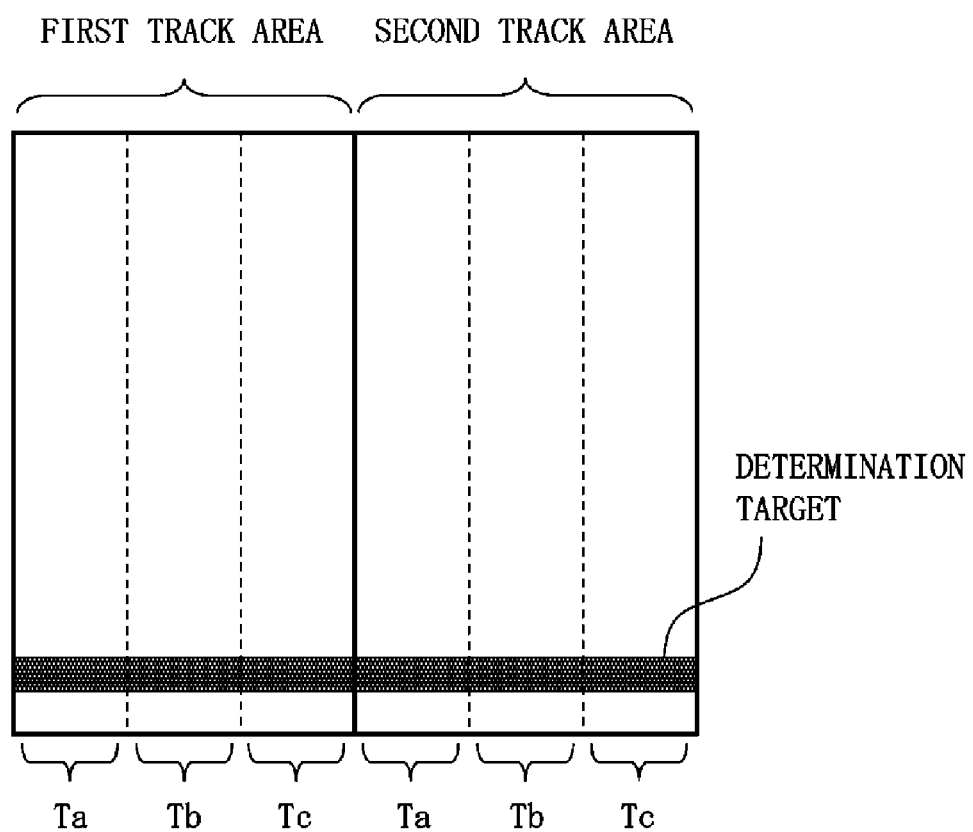
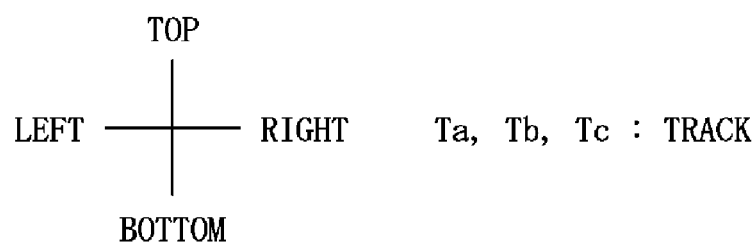

FIG. 5
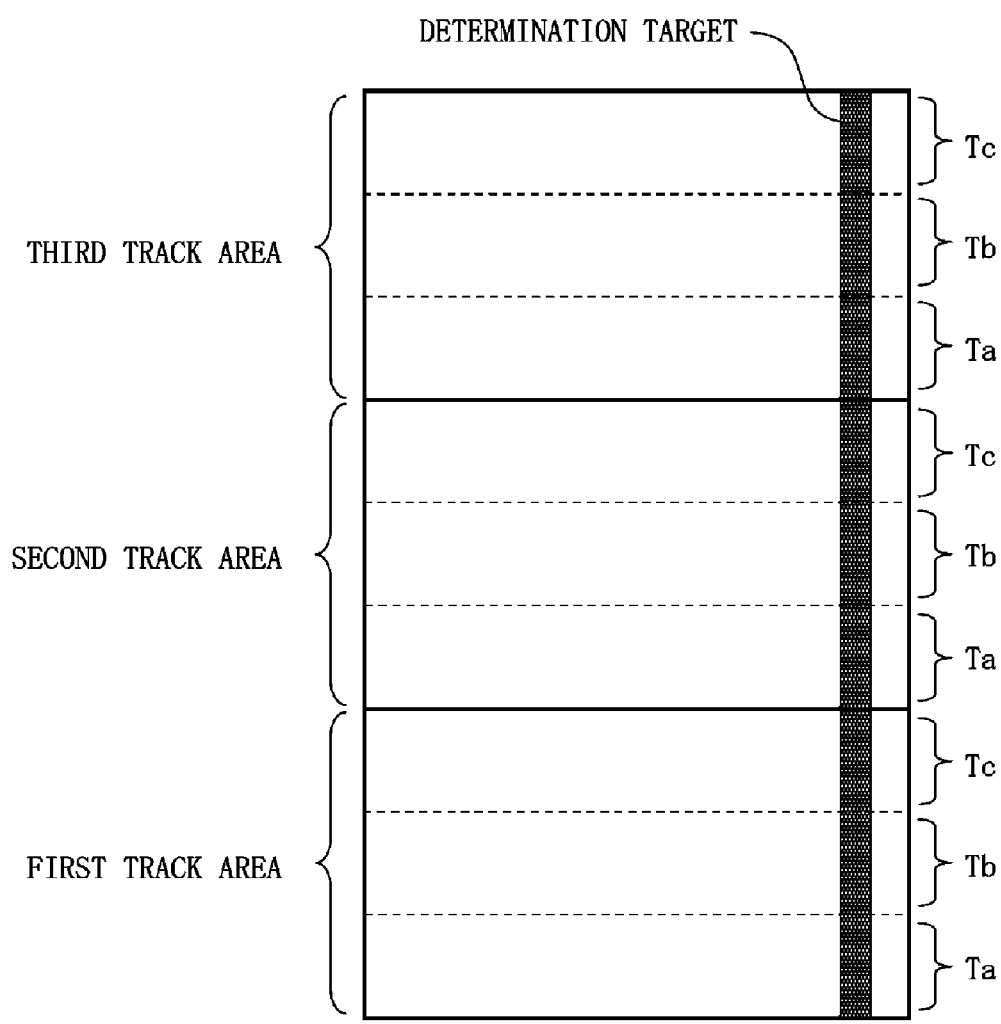
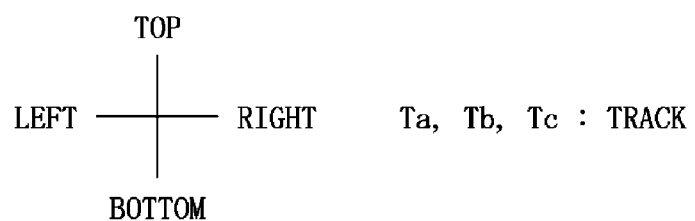

FIG. 9
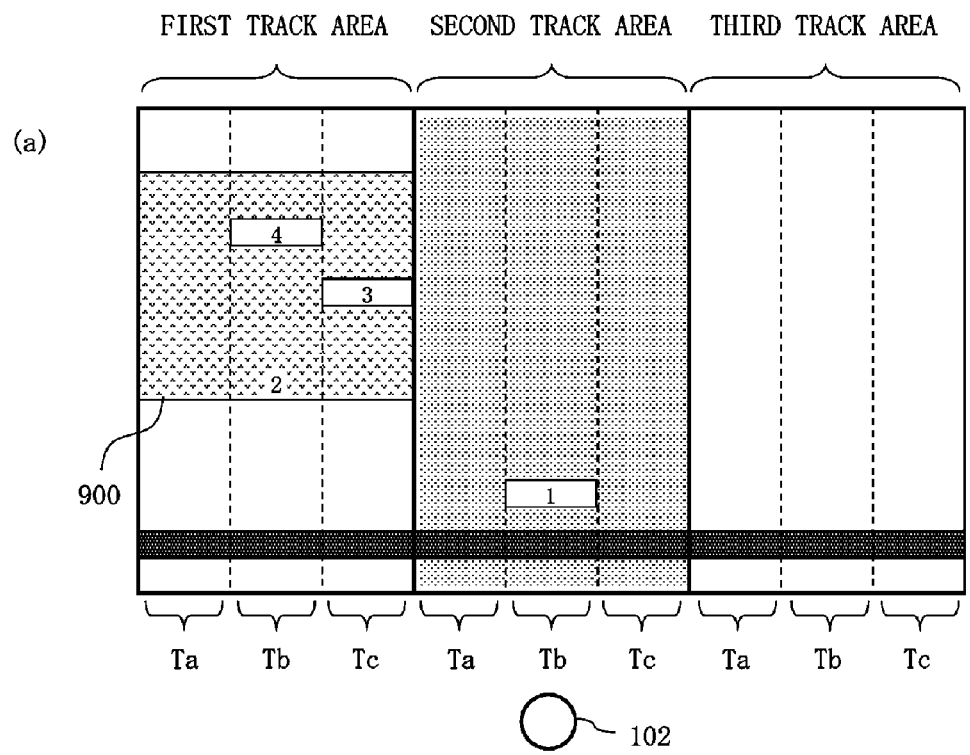
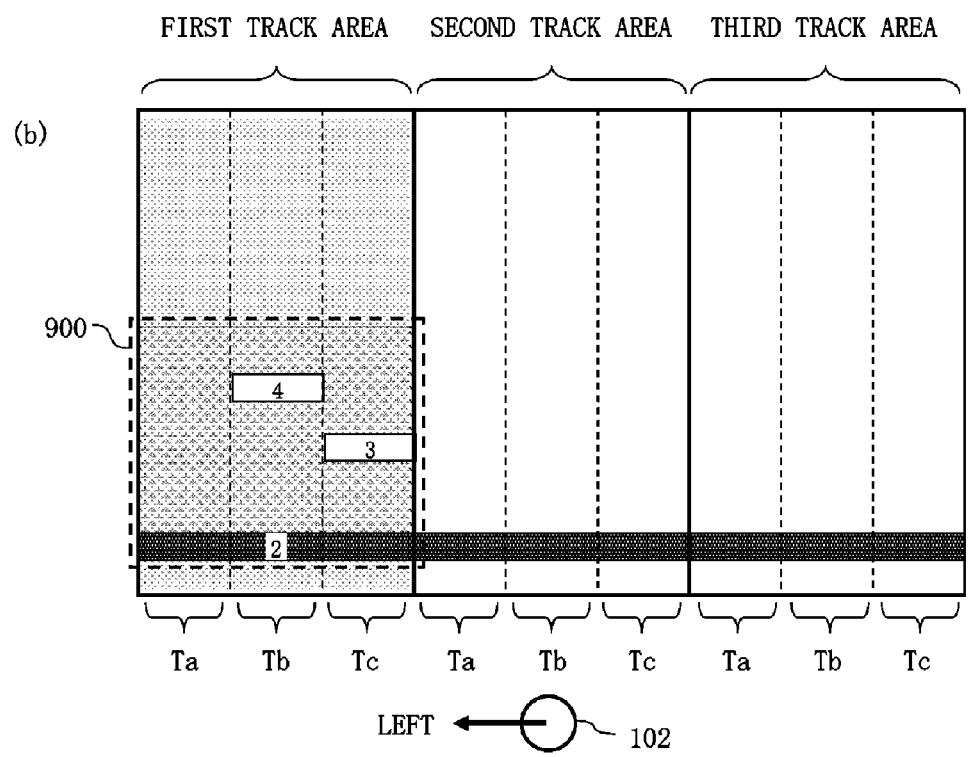

FIG. 11
(a)
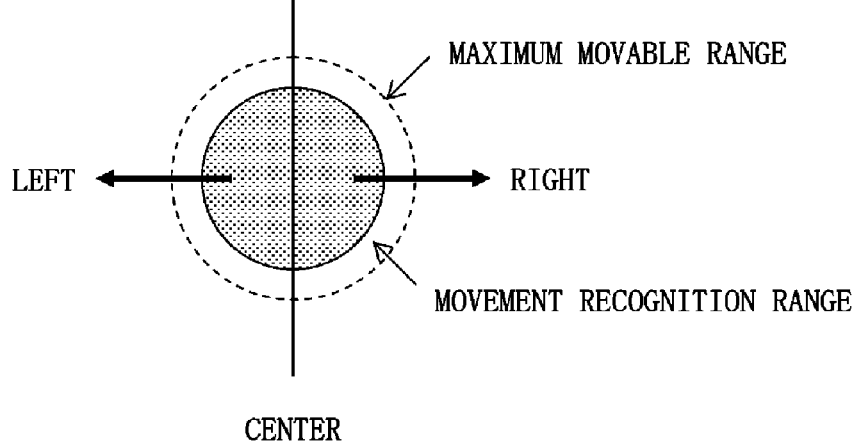
(b)
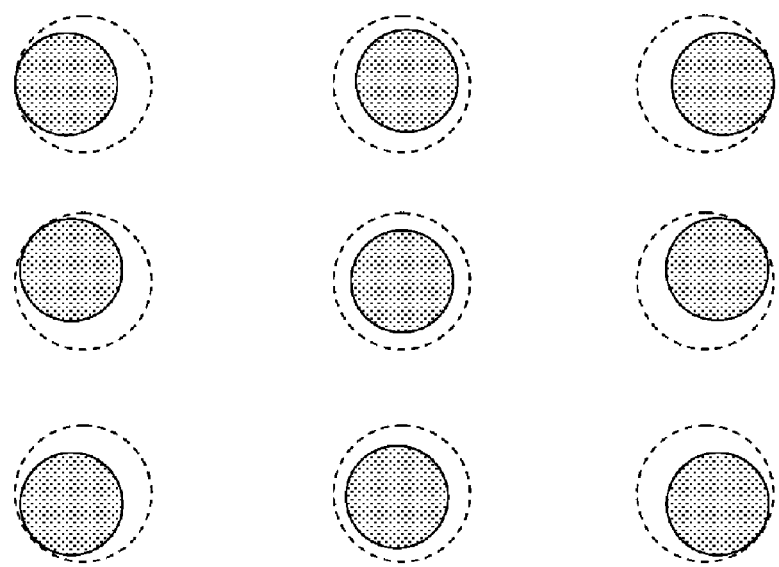
LEFT OPERATION STATE    CENTRAL STATE (DEFAULT STATE)    RIGHT OPERATION STATE FIG. 13
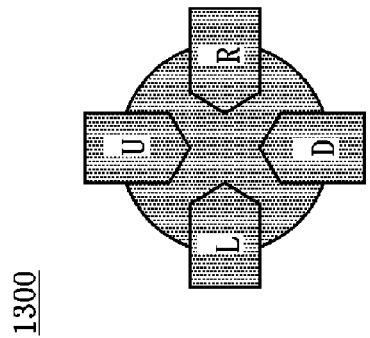
1300
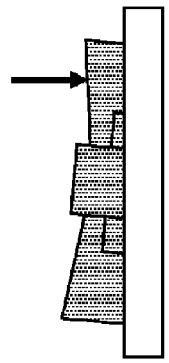
RIGHT OPERATION STATE
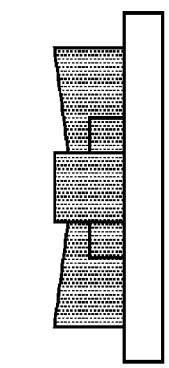
CENTRAL STATE (DEFAULT STATE)
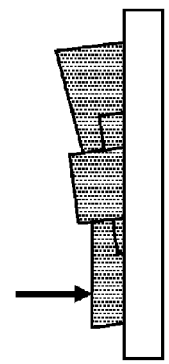
LEFT OPERATION STATE
(a)
(b)

FIG. 14
1410
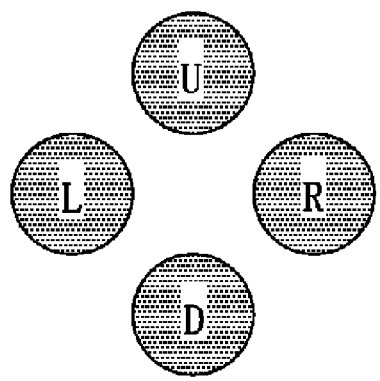
1420

FIG. 15
1510
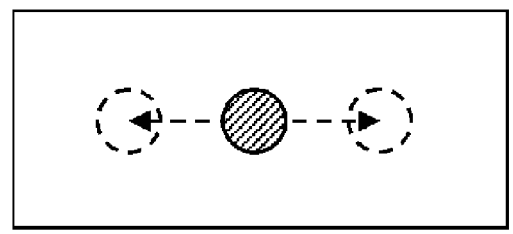
1520
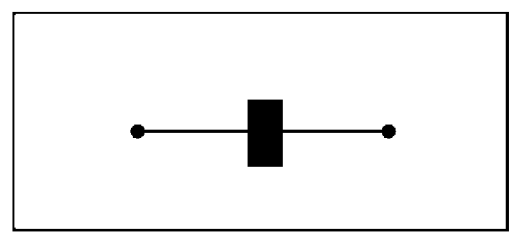
1530

FIG. 16
103
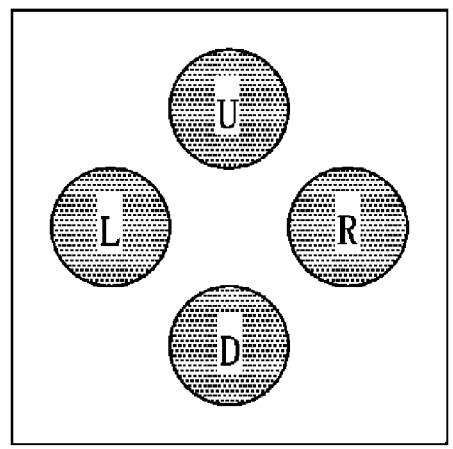
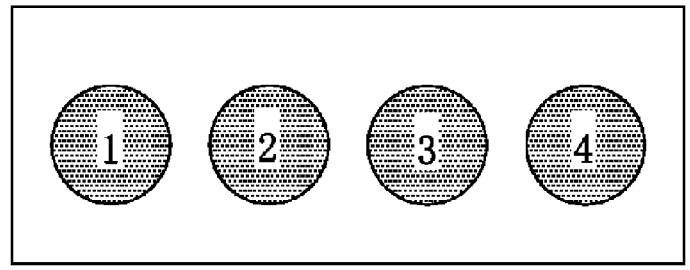

METHOD, APPARATUS AND RECORDING MEDIUM FOR PERFORMANCE GAME

CROSS-REFERENCE TO RELATED APPLICATION

This application claims priority from and the benefit under 35 U.S.C §119(a) of Korean Patent Application No. 10-2010-0044956, filed on May 13, 2010, which is hereby incorporated by reference for all purposes as if fully set forth herein.

BACKGROUND OF THE INVENTION

1. Field of the Invention

The present invention relates to a method, an apparatus, and a recording medium for a performance game, and more specifically to a method, an apparatus, and a recording medium for a performance game in which a user plays indicators in a plurality of areas while moving in corresponding areas.

2. Description of the Prior Art

In a conventional performance game for playing music, a construction of an indicator for playing music is defined by one note or one track (a section in which the note for performance moves) for each operation device (controller), and the performance game is played in a manner of playing the note which is the indicator. Such a conventional performance game method has limitations in that the method cannot provide various and interesting games.

SUMMARY OF THE INVENTION

Accordingly, an object of the present invention has been made to provide a performance game for playing indicators in corresponding areas while a user moves in a plurality of areas.

In order to accomplish this object, there is provided an apparatus for a performance game, including: a game screen controller for displaying a plurality of track areas in a game screen, and controlling notes in such a manner that the notes are displayed for each of the plurality of track areas while moving toward a position where determination targets are located; a track area controller for setting one track area of the plurality of track areas as an activation track area according to an activation track area movement operation of a user; and a performance operation controller for comparing positions of the notes and the determination targets in the track area set as the activation track area to determine accuracy of a performance operation when a performance operation signal is generated according to a performance operation of the user.

In accordance with another aspect of the present invention, there is provided a method for a performance game, including the steps of: approaching notes, which are displayed while moving in a specific track area of a plurality of track areas, to determination targets; recognizing an activation track area movement operation signal of a user; setting the specific track area as the activation track area according to the activation track area movement operation signal; recognizing a performance operation signal according to the performance operation of the user; comparing positions of the notes and the determination targets at the time in which the performance operation signal is recognized to determine accuracy of the performance operation; and generating an expression effect according to a result of determining the accuracy of the performance operation.

In accordance with another aspect of the present invention, there is provided a computer readable recording medium recording a program for executing a performance game method, the computer readable recording medium including the functions of: displaying a plurality of track areas in a game screen and controlling notes in such a manner that the notes are displayed for each of the plurality of track areas while moving toward a position where determination targets are located; setting one track area of the plurality of track areas as an activation track area according to an activation track area movement operation of a user; and comparing positions of the notes and the determination targets in the track area set as the activation track area to determine accuracy of a performance operation when a performance operation signal of the user is generated.

In accordance with another aspect of the present invention, there is provided an apparatus for a performance game, including: a display for displaying a plurality of track areas including one or more tracks and displaying notes moving toward positions where determination targets are located, along the plurality of track areas; a track area operation device for setting one track area of the plurality of track areas as an activation track area according to an activation track area movement operation of a user; and a performance operation device including one or more operation buttons for performing the performance operation of the user for the track area set as the activation track area.

In accordance with another aspect of the present invention, there is provided an apparatus for a performance game, including: a screen display unit for displaying a plurality of areas including one or more tracks in a game screen for the performance game and displaying fixed indicators and moving indicators in the plurality of areas; a performance area setting unit for setting one area of the plurality of areas as a performance area according to an operation of a user; and a performance determination unit for comparing positions of the fixed indicators and the moving indicators in the area set as the performance area to determine an success or accuracy of the performance operation for the fixed indicators and the moving indicators.

BRIEF DESCRIPTION OF THE DRAWINGS

FIGS. 2 to 5 are examples illustrating a plurality of track areas and determination targets, which are displayed in a game screen;

FIGS. 9A and 9B are examples illustrating the displays of various kinds of notes (and the performance operation for the various kinds of notes;

FIGS. 11A to 15 are examples of various kinds of track area operation devices 102;

FIG. 16 is examples of the performance operation device 103;

DETAILED DESCRIPTION OF THE PREFERRED EMBODIMENTS

Figure 1:
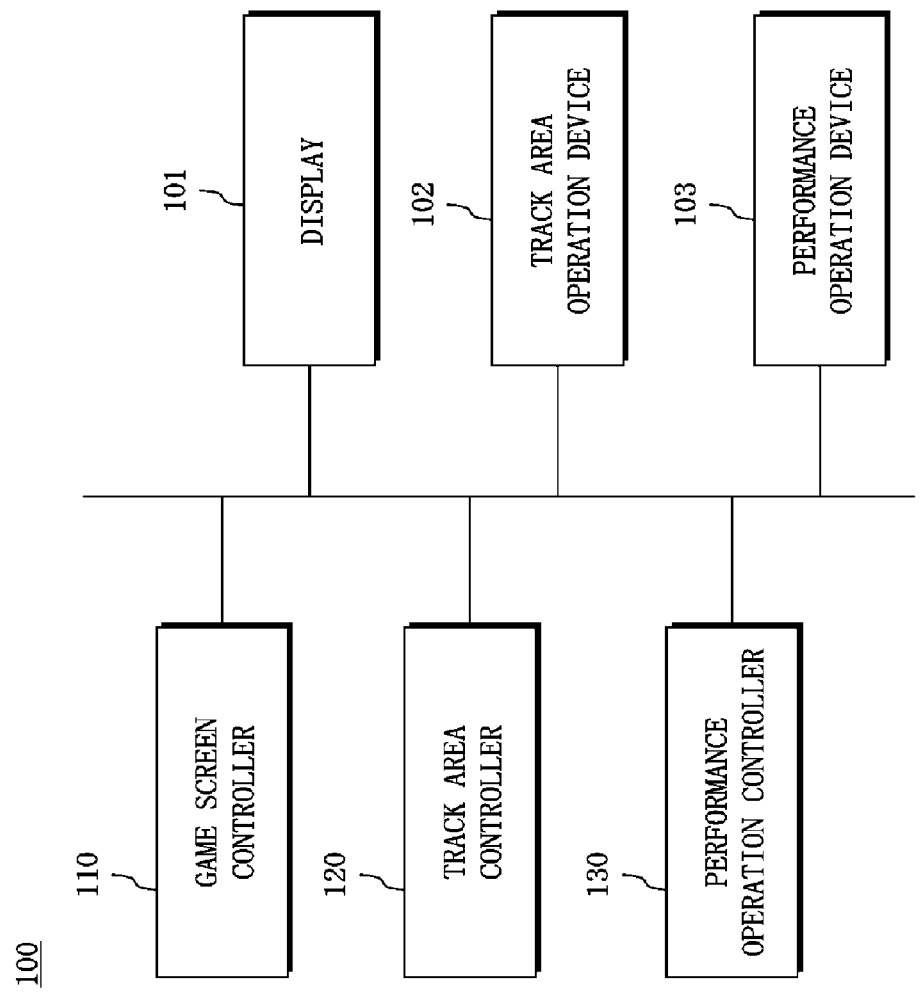
FIG. 1 is a block diagram of a performance game apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram of an apparatus 100 (hereinafter, referred to as "performance game apparatus") for a performance game according to an embodiment of the present invention.

The performance game apparatus 100 shown in FIG. 1 is an apparatus providing the performance game by a method in which notes are displayed while moving toward a determination target located at an end of a track, a performance operation by a user is performed at the time in which it is determined that positions of the moving notes are identical to positions of the determination targets, and it is determined that the positions of the notes and the determination targets are exactly the same at the time in which performing the performance operation is performed. Such a performance game may be, for example, a music performance game in which a user reproduces specific music as background music and then performs the performance operation according to a reproduction flow of the music while the music is reproduced.

As shown in FIG. 1, the performance game apparatus 100 for such a performance game includes a game screen controller 110 for constructing the performance game for the performance operation in a game screen, to provide the user with the game screen, a track area controller 120 for controlling the track areas in which the notes move and being displayed on the provided game screen, and a performance operation controller 130 for recognizing the performance operation of the user, to determine the performance operation. Further, the game screen constructed by the game screen controller 110 is displayed in a display 101, and the track area controller 120 accepts the track area operation (hereinafter, referred to as an "activation track area movement operation") performed by the user through the track area operation device 102, to control the track area. Further, the performance operation controller 130 accepts the performance operation performed by the user through the performance operation device 103, to determine the performance operation.

The game screen controller 110 provides the performance game by displaying the game screen, which is constructed for providing the performance game, in the display 101. In constructing and displaying the game screen, the game screen controller 110 displays a plurality of track areas in the game screen and controls notes such that the notes are displayed for each of the track areas while moving toward the determination targets.

The track area controller 120 sets one of the plural track areas as an activation track area according to the movement operation of the activation track area. Therefore, the plural track areas are alternately set as the activation track area.

When a performance operation signal is generated according to the performance operation by the user, the performance operation controller 130 determines the accuracy of the performance operation by comparing positions of the notes with positions of the determination targets in the track areas set as the activation track area.

In the following description, a game screen construction method for providing the user with the game screen after the game screen controller 110 constructs the performance game in which the performance operation is possible in the game screen will be discussed in detail.

Before the description of the method for constructing the game screen, the activation track area, which is related to the game screen construction method and one of core concepts of the performance game method discussed as an example in the present invention, will be simply described.

The "track area" mentioned in the present invention refers to an area including one or two tracks, which are sections in which the notes move for the performance. Embodiments of the present invention include plural track areas. In embodiments of the present invention, one of the plural track areas is as the "activation track area" and the performance operation is determined only for the track areas set as the activation track area. If the track area includes plural tracks, at this time, the track area is referred to as a "track group".

The "activation track area" mentioned in the present invention refers to one track area selected by the user among the plural track areas, and refers to a special track area accepting the performance operation of the user by a performance operation signal, to determine the performance operation.

As described above, by setting the activation track area and accepting the performance operation signal only from the activation track area to determine the performance operation, it is possible to perform the performance operation in all the plural track areas even when the number of performance operation devices 103 is not as many as the number of track areas (track areas may include the plural tracks). For example, when there are three track areas and each of the three track areas includes three tracks, if the performance operation for each track area is performed by each performance operation controller 103, three performance operation controllers 103 including three operation buttons corresponding to the three tracks should be provided. That is, nine operation buttons corresponding to nine tracks included in the three track areas are required. However, when one of the three track areas is set as the activation track area and the performance operation signal only for the track area set as the activation track area is accepted to determine the performance operation, only the three operation buttons corresponding to the three track areas included in the track area set as the activation track area are required.

With regard to setting the activation track area, the game screen controller 110 can display that the track area set as the activation track area among the plural track areas is distinguished from other track areas in constructing the game screen. For example, the track area set as the activation track area can be distinguished by differentiating a color of a back panel of the track area set as the activation track area from colors of back panels of other track areas or adding a separate sign to the track area set as the activation track area.

Further, with regard to displaying the plural track areas, when the game screen controller 110 constructs the game screen in which the plural track areas are displayed, the game screen controller 110 can construct the game screen in which each of the plural track areas includes one or more track areas. For example, when there are three track areas, a left track area may include three tracks, a central track area may include five tracks, and a right track area may include one track. Further, when there are two track areas, both left and right track areas may include three tracks, respectively. The displays with regard to the track area and the track on the game screen will be again described with reference to FIGS. 2 to 5.

Moreover, with regard to displaying the notes, when the game screen controller 110 displays the note in each of the plural track areas, various notes can be displayed by display methods (e.g. a size, a color, a shape, etc.), and a performance method. For example, the performance operation for the note displayed for each of the plural track areas can be performed through the performance operation device 103 after setting the activation track area according to the movement operation of the activation track area through the track area operation device 102. The note generally includes "a sampler note" having a width identical to a width of a corresponding track included in a corresponding track area, and may include "a turntable note", for which performance operation can be performed only by the movement operation of the activation track area through the track area operation device 102 without the performance operation of the performance operation device 103 by the user, and having a width identical to a width of a corresponding track area. That is, the note displayed for each of the plural track areas may include one or more notes between the sampler note and the turntable note. A method for displaying the notes and a method for performing the performance operation for the notes according to the method for displaying the notes will be described with reference to FIGS. 8 to 10.

Figure 7:
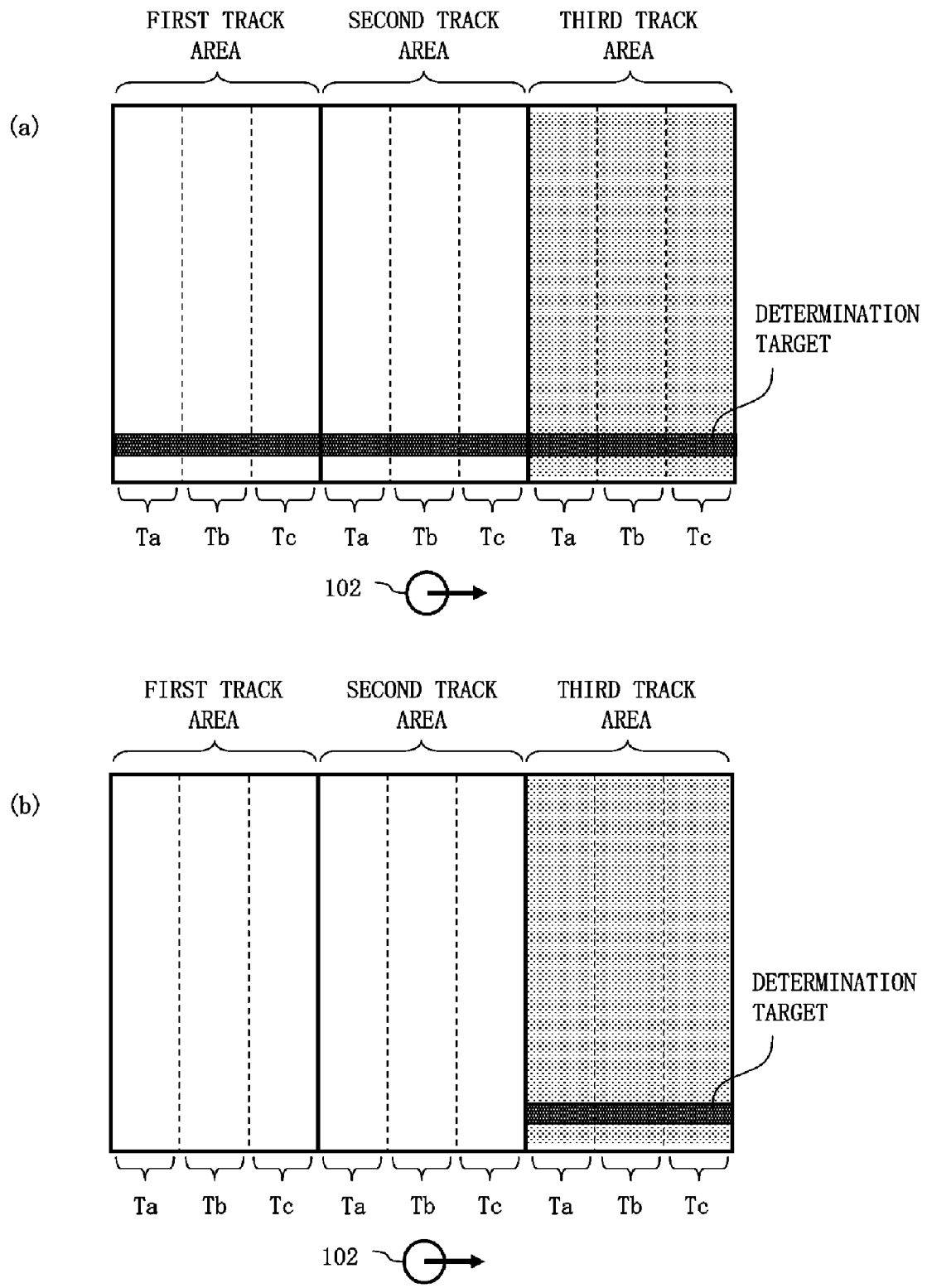
FIGS. 7A to 7B are examples of a method for displaying the determination targets.

Further, with regard to displaying the determination target, the game screen controller 110 can separately allocate the number of determination targets equal to the number of track areas corresponding to the plural track areas, or can allocate one determination target commonly applied to all of the plural track areas. Furthermore, the game screen controller 110 can display the determination target in each of the track areas as shown in FIG. 7A, or the determination target only in the track area set as the activation track area among the plural track areas in order to improve discrimination of the activation track area as shown in FIG. 7B.

The game screen construction method for constructing the performance game for performing the performance operation on the game screen and providing the game screen to the user has been described so far. Hereinafter, with regard to the game screen construction, a method, which controls the plural track areas according to the selection of the user (selection by which track area is to be set as the activation track area) through the track area controller 120 while the user is playing the performance game, will be described in detail.

The track area controller 120 sets one of the plural track areas as the activation track area according to the movement operation of the activation track area by the user. Further, the track area controller 120 recognizes a direction (e.g. left, right, etc.) for the movement operation of the activation track area by the user, and then can set one of the plural track areas as the activation track area according to the recognized direction.

In setting the activation track area based on the recognized direction for the movement operation of the activation track area by the user, when the movement operation of the activation track area by the user is once performed in one direction, the setting can be implemented by a first method of setting the track area corresponding to the corresponding direction as the activation track area, or a second method of maintaining that the track area corresponding to the corresponding direction is set as the activation track area only while the movement operation of the activation track area by the user is continuously performed in one direction.

When the activation track area is set by using the second method between the two methods, the track area controller 120 sets one of the plural track areas as the activation track area according to the recognized direction and maintains the setting while the direction for the movement operation of the activation track area is continuously recognized. When the direction for the movement operation of the activation track area is not recognized or the direction which has been continuously recognized for the activation track area is not recognized, the track area controller 120 can reinstate and set a predefined default track area among the plural track areas as the activation track area. Here, the default track area refers to a track area preset as the activation track area among the plural track areas when the movement operation of the activation track area is not performed by the user. As an example, the default track area may be a central track area when there are three track areas including left, central, and right track areas, or the default track area may be a left track area or a right track area when there are two track areas including left and right track areas.

The track area controller 120 may include the track area operation device 102 capable of performing the movement operation of the activation track area of the user in two or more directions as shown in FIG. 1.

With regard to the second method of setting the activation track area, the track area operation device 102 is in a default state or is located in a default position when the movement operation of the activation track area by the user is not performed, and the track area operation device 102 is in an operation state (e.g. left operation state, right operation state, etc.) or can be located in an operation position (e.g. left operation position, right operation position, etc.) only when the movement operation of the activation track area by the user is maintained.

Further, the track area operation device 102 can be implemented by one of an analog stick, a joystick, a seesaw-type button, a button which can accept plural inputs at the same time, and a touch device. Examples of the implementations of the track area operation device 102 will be described with reference to FIGS. 11 to 15.

The function related to the setting of the activation track area by the track area controller 120 has been described so far. Hereinafter, the performance operation controller 130 for determining the performance operation by accepting the performance operation by the user will be described.

First, the performance game apparatus 100 according to an embodiment of the present invention may include the performance operation device 103, which the user can operate, in order to perform the performance operation of the user. At this time, the performance game apparatus 100 may include plural performance operation devices 103 for individual performance operations for each of the plural track areas, or one performance operation device 103 for common performance operations for the plural track areas. That is, the performance game apparatus 100 according to an embodiment of the present invention may include the number of performance operation devices 103 equal to the number of the track areas or include one performance operation device 103.

Each of the number of plural performance operation devices 103 equal to the number of track areas or the one performance operation device 103 commonly corresponding to all the track areas may include an operation button corresponding to each of the tracks included in the plural track areas. That is, each of the performance operation devices 103 should include the number of operation buttons more than the maximum number of tracks included in each track area. For example, when there are three track areas including a first track area having three tracks, a second track area having five tracks, and a third track area having three tracks and the performance operation for the three track areas is performed, the performance operation device 103 should include five operation buttons at least because the performance operation device 103 should include the number of operation buttons more than the maximum number of tracks included in one track area, based on an assumption that one performance operation device 103 is used.

The performance operation controller 130 accepts the performance operation by the user through the performance operation device 103, to determine the performance operation in the track area set as the activation track area. It may be difficult for unskilled users to quickly perform the performance operation while alternately setting the activation track area according to patterns of the notes moving in each of the track areas. Therefore, in order to help overcome the difficulty of performing the performance operation with changing the setting of the activation track area, when the track area set as the activation track area includes the plural tracks, although the performance operation signal is generated in the operation button corresponding to one track included in the track area set as the activation track area, the performance operation controller 130 can determine the accuracy of the performance operation by comparing positions of the notes moving according to other tracks included in the track area set as the activation track area and positions of the determination targets. Such a determination method can be applied when the user sets a mode of the performance game as an easy mode.

For example, in the determination method, when the user performs the performance operation by using the operation button corresponding to the first track although the user should perform the performance operation for the note coming down in the second track included in the second track area (including first tack, second track, and third track) set as the activation track area by using the operation button corresponding to the second track, it is determined as the wrong performance operation although the timing is generally right. However, when the aforementioned determination method is applied, if the timings between a point when the user performs the performance operation by using the operation button corresponding to the first track and a point when a position of the note coming down in the second track is identical to a position of the determination target are the same although the performance operation is performed by the wrong operation button, it can be determined as a successful performance operation.

Meanwhile, the performance operation controller 130 determines the accuracy of the performance operation and assigns scores according to the determined accuracy to display the scores in the game screen. At this time, the performance operation controller 130 can assign different scores for the plural track areas or different scores according to note patterns.

For example, when there are three track areas including a left track area, a central track area, and a right track area, a higher score can be assigned to the performance operation for the notes in the left track area and the right track area because the performance operation for the notes in the left track area and the right track area may be more difficult than the performance operation for the notes in the central track area. Further, when difficult note patterns in which many notes reach the determination targets in the plural track areas at the similar timing are displayed, the user should perform the performance operation while very quickly changing the setting of the activation track area in order to perform the performance operation for the difficult note patterns. Therefore, quick judgment and nimble fingers are required and a higher score can be assigned to the performance operation for the difficult note pattern in comparison with an easy note pattern.

Meanwhile, the performance operation controller 130 can generate an expression effect (e.g. various expression effect information, various expression effect sounds, various expression effect vibrations, etc.).

Meanwhile, the performance game provided by the performance game apparatus 100 according to an embodiment of the present invention is a game in which the notes are displayed while moving toward the determination targets in an end of the track and the user performs the performance operation at the time in which it is determined that positions of the moving notes are identical to positions of the determination targets, to determine the positions of the notes and the positions of the determination targets are exactly the same at the time in which the performance operation is performed. For example, the performance game may be a game in which specific music stored in a memory is reproduced as background music, the notes are displayed as patterns according to a reproduction flow (e.g. sheet music, etc.) of the music in each track area and move in each track area, and the user performs the performance operation for the notes displayed and moving according to the reproduction flow of the music and the expression effects or tones according to the performance operation are output.

When the performance game apparatus 100 provides the aforementioned music performance game, the game screen controller 110 displays the notes as patterns according to the reproduction flow (e.g. sheet music) of the music, for all the plural track areas or partial specific track areas (one or more track areas) of the plural track areas, and the performance operation controller 130 can output partial tones of the music or expression effects corresponding to the notes after determining the accuracy of the performance operation for the notes in all the plural track areas or the partial specific track areas.

When the game screen controller 110 displays the notes as patterns according to the reproduction flow (e.g. sheet music, etc.) of the music for the partial track areas of the plural track areas, instead of all the track areas and the performance operation controller 130 outputs partial tones of the music or expression effects corresponding to the notes after determining the accuracy of the performance operation for the notes in the partial specific track areas, the game screen controller 110 displays notes regardless of the reproduction flow of the music related to the patterns of the notes in the partial specific track areas for other track areas except the partial specific track areas and the performance operation controller 130 can output tones or expression effects different from the partial tones of the music or the expression effects output according to the performance operation for the notes in the partial specific track areas after determining the accuracy of the performance operation for the notes in other track areas except the partial specific track areas.

For example, when there are three track areas including a first track area (left track area), a second track area (central track area), and a third track area (right track area), the notes are displayed as the pattern according to the reproduction flow of the music in the second track area (central track area) and tones corresponding to the notes are output by a result of the performance operation for the notes so that the original music can be performed through the second track area (central track area). Further, the notes are displayed as the pattern which is irrelevant to the reproduction flow of the music in the first track area (left track area) and the third track area (right track area) and different tones or expression effects are output, instead of the output of tones of the music, by a result of the performance operation so that the expression operation such as changing the original music performed through the second track area (central track area) or adding an effect to the original music can be generated. Through the expression, the performance game apparatus 100 according to an embodiment of the present invention can provide a music performance game capable of performing a "remix expression".

Figure 18:
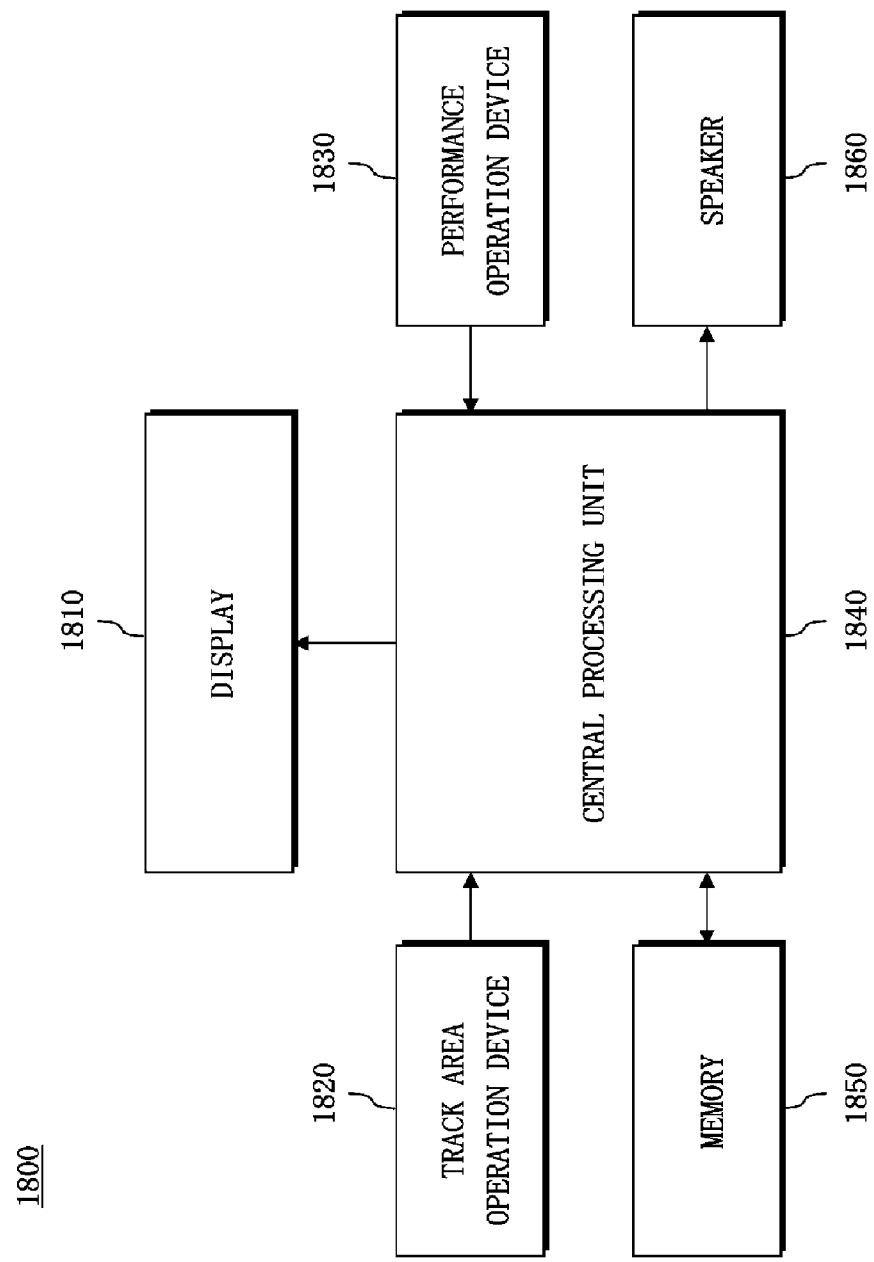
FIG. 18 is a block diagram of a performance game apparatus according to another embodiment of the present invention.
Figure 19:
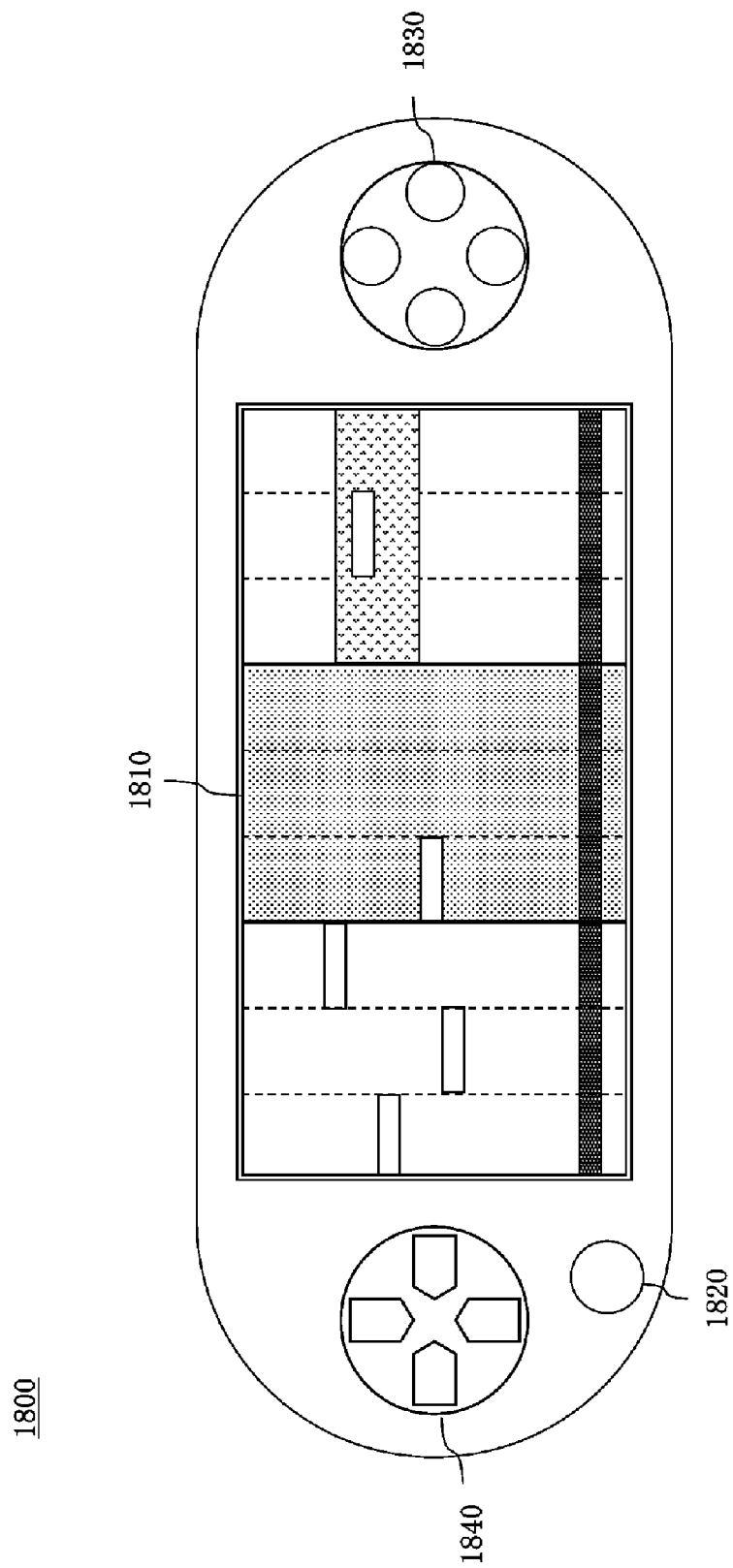
FIG. 19 is an example of the performance game apparatus implemented as the portable game machine according to another embodiment of the present invention.

The performance game apparatus 100 according to an embodiment of the present may be an arcade game machine, which can be used in a game room, a portable game machines such as Play Station Portable (PSP), a Personal Digital Assistant (PDA), and a Portable Media Player (PMP), portable terminals such as a smart phone and a mobile communication terminal, or computers such as a desktop computer and a laptop computer. The performance game apparatus 100 has a hardware construction as shown in FIG. 18, and can be implemented as a portable game machine as shown in FIG. 19.

The performance game apparatus 100 according to an embodiment of the present invention has been described so far. Hereinafter, constructions of the game screen (displaying track areas, tracks, notes, determination targets, etc.), a setting of the activation track area, and a method of the performance operation for the notes will be described with reference to the figures.

FIGS. 2 to 5 are examples illustrating the plural track areas and determination targets constructed by the game screen controller 110 and then displayed in the game screen, in order to provide the performance game.

Figure 2:
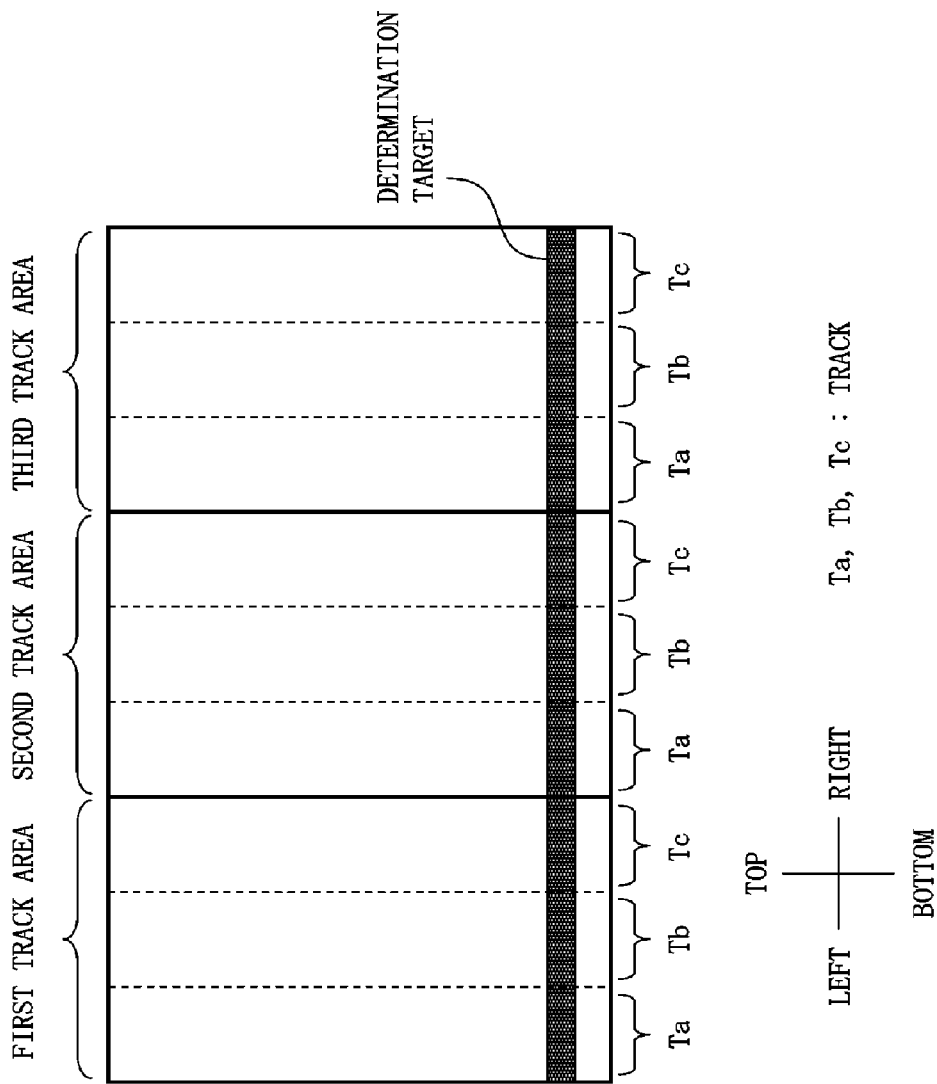

FIG. 2 is an example of the game screen when there are three track areas.

According to the construction of the game screen shown in FIG. 2, the game screen is divided into three track areas (a first track area, a second track area, and a third track area) for left and right directions (horizontal direction) and the divided three track areas are displayed, and each of the track areas is divided into three identical tracks (a Ta track, a Tb track, and a Tc track) for the left and right directions (horizontal direction). Further, the determination targets are displayed in a lower end of each track area based on an assumption that the notes come down from an upper part to a lower part of the game screen.

FIG. 3 is an example of the game screen when there are two track areas.

According to the construction of the game screen shown in FIG. 3, the game screen is divided into two track areas (a first track area and a second track area) for the left and right directions (horizontal direction) and the divided two track areas are displayed, and each of the track areas is divided into two identical tracks (a Ta track, a Tb track, and a Tc track) for the left and right directions (horizontal direction). Further, the determination targets are displayed in a lower end of each track area based on an assumption that the notes come down from an upper part to a lower part of the game screen.

Figure 4:
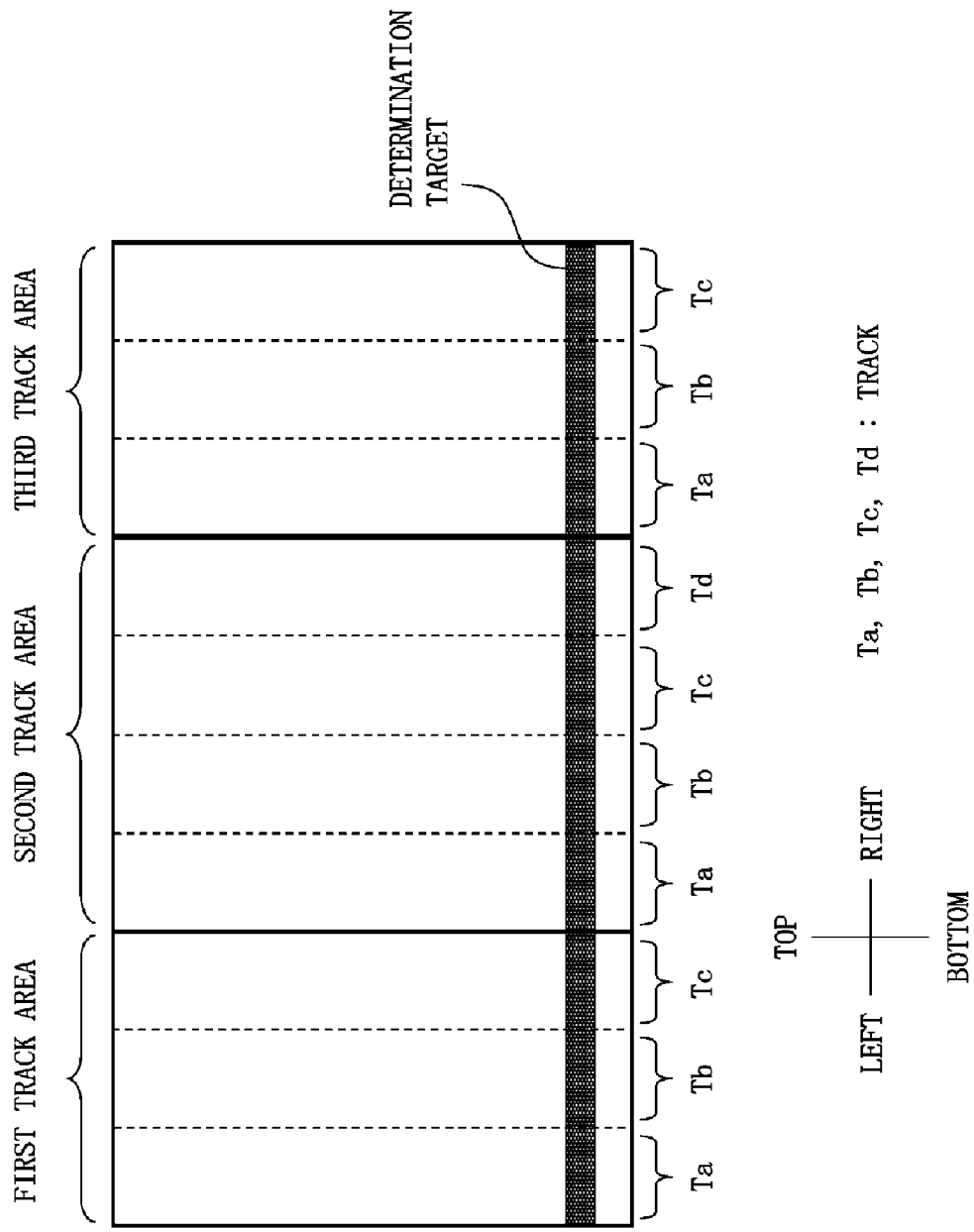

FIG. 4 is a construction of the game screen when there are three track areas and the number of tracks included in each track area is not all the same.

According to the construction of the game screen shown in FIG. 4, the game screen is divided into three track areas (a first track area, a second track area, and a third track area) for the left and right directions (horizontal direction) and the divided three track areas are displayed, and the first track area and the third track area are divided into three identical tracks (a Ta track, a Tb track, and a Tc track) for the left and right directions (horizontal direction), respectively, but the second track area is divided into four tracks (a Ta track, a Tb track, a Tc track and a Td track) for the left and right directions (horizontal direction). Further, the determination targets are displayed in a lower end of each track area based on an assumption that the notes come down from an upper part to a lower part of the game screen.

FIG. 5 is a construction of the game screen when the game screen is divided into the plural track areas for top and bottom directions.

According to the construction of the game screen shown in FIG. 5, the game screen is divided into three track areas (a first track area, a second track area, and a third track area) for the top and bottom directions (vertical direction) and the divided three track areas are displayed, and each of the track areas is divided into identical three tracks (a Ta track, a Tb track, and a Tc track) for the top and bottom directions (vertical direction). Further, the determination targets are displayed in a right end of each track area based on an assumption that the notes move from a left part to a right part of the game screen.

Figure 6:
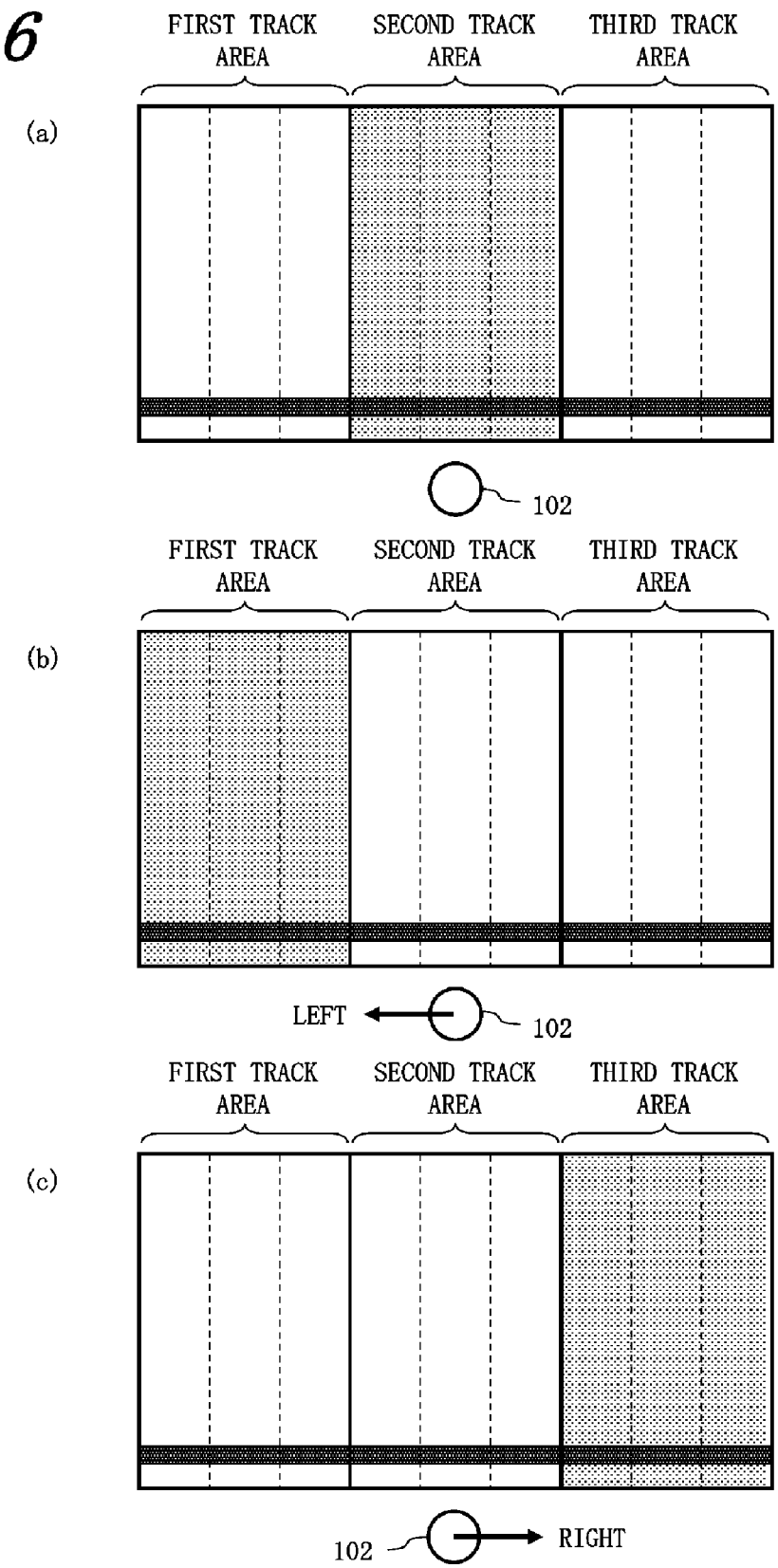
FIGS. 6A to 6C are examples illustrating setting the activation track area by changing one of the plural track areas to the activation track area according to patterns of the notes.

FIGS. 6A to 6C are examples illustrating settings of the activation track area by changing one of the plural track areas to the activation track area according to patterns of the notes.

A construction of the game screen shown in FIGS. 6A to 6C for describing the change setting of the activation track area (movement) divides the game screen into three track areas (a first track area, a second track area, and a third track area), and each of the track areas is divided into three identical tracks (a Ta track, a Tb track, and a Tc track) for the top and bottom directions (vertical direction). Further, in FIGS. 6A to 6C, the track area set as the activation track area is differentiated from other track areas and then displayed.

For reference, when there are three track areas including a first track area, a second track area, and a third track area in the present invention, the first track area is referred to as a left track area, the second track area is referred to as a central track area, and the third track area is referred to as a right track area. Further, when there are two track areas including a first track area, and a second track area, the first track area is referred to as a left track area and the second track area is referred to as a right track area.

FIG. 6A illustrates a construction of the game screen in a case where the user does not operate the track area operation device 102 for the movement operation of the activation track area at all. In this case, the second track area (central track area), which is predefined as a default track area, is set as the activation track area so that the second track area is differentiated from other track areas (first and third track areas) and then displayed.

FIG. 6B illustrates a construction of the game screen in a case where the user continuously operates the track area operation device 102 for the movement operation of the activation track area in a left direction. In this case, the first track area (left track area) corresponding to the left direction is set as the activation track area so that the first track area is differentiated from other track areas (second and third track areas) and then displayed. When the user takes his/her hand off the track area operation device 102, that is, when the track area operation device 102 does not recognize the direction of the movement operation of the activation track area by the user in a state of FIG. 6B, the state of FIG. 6B returns to a state of FIG. 6A.

FIG. 6C illustrates a construction of the game screen in a case where the user continuously operates the track area operation device 102 for the movement operation of the activation track area in a right direction. In this case, the third tack area (right track area) corresponding to the right direction is set as the activation track area so that the third track area is differentiated from other track areas (first and second track areas) and then displayed. When the user takes his/her hand off the track area operation device 102, that is, when the track area operation device 102 does not recognize the direction of the movement operation of the activation track area by the user in a state of FIG. 6C, the state of FIG. 6C returns to a state of FIG. 6A.

FIGS. 7A to 7B are examples of a method for displaying the determination targets.

As an example, the method for displaying the determination targets may display the determination targets in all three track areas (the first track area, the second track area, and the third track area) as shown in FIG. 7A or may display the determination targets only in the third track area set as the activation track area among the three track areas (the first track area, the second track area, and the third track area) in order to improve discrimination of the activation track area as shown in FIG. 7B.

Figure 8:
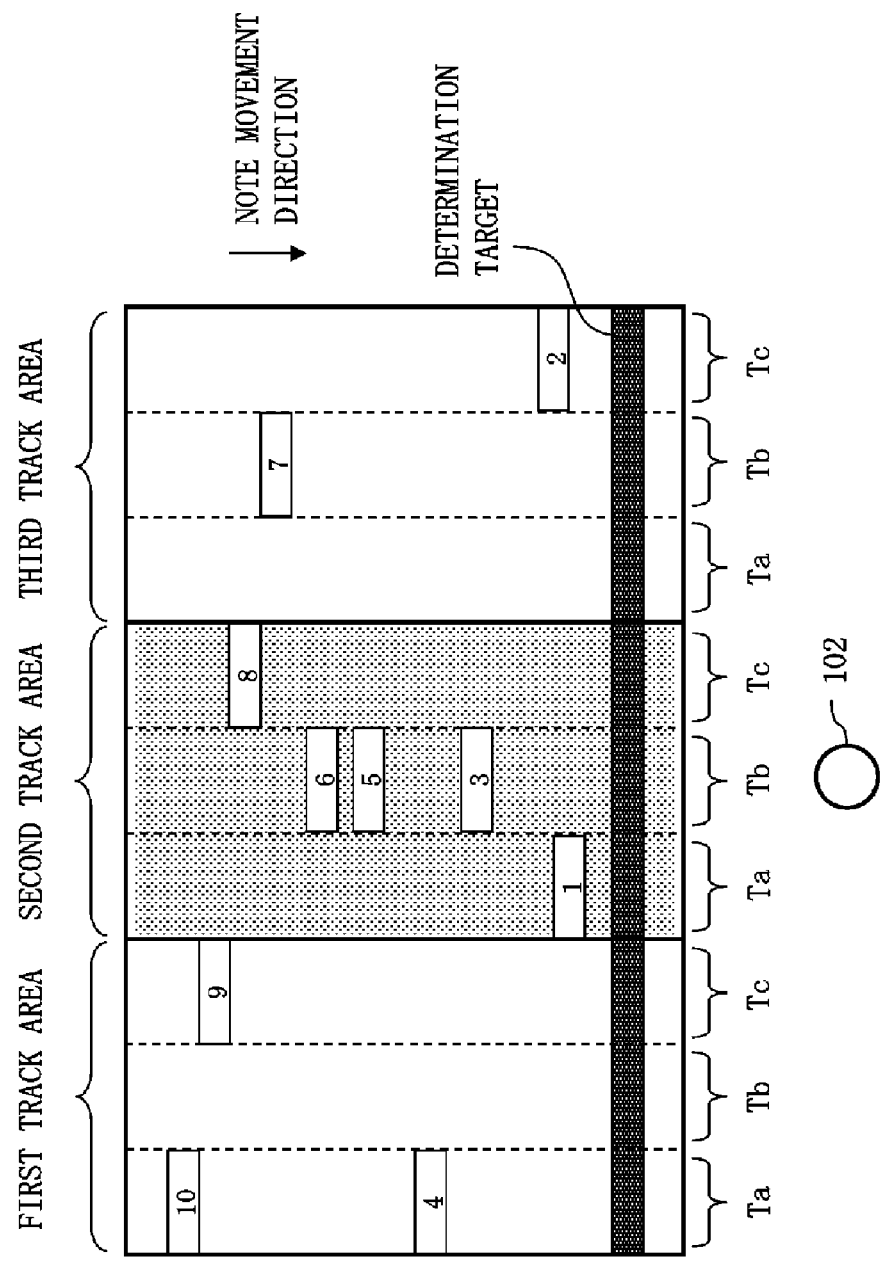
FIG. 8 is an example illustrating the note displays and the performance operation for the displayed notes.

FIG. 8 is an example illustrating the note displays and the performance operation for the displayed notes.

With reference to the game screen shown in FIG. 8, the game screen is displayed in which the notes having a pattern shown in FIG. 8 drop in each of the three track areas (the first track area, the second track area, and the third track area). Therefore, the user should perform the performance operation for ten notes including three notes of the first track area, five notes of the second track area, and two notes of the third track area. Numbers indicated in the ten notes shown in FIG. 8 mean an order of the performance operation.

In consideration of the movement direction of the notes, the user can perform the performance operation for the ten notes in an order of a first note, a second note, . . . , and a tenth note. When the user operates each of the notes, the user sets a corresponding track area as the activation track area by using the track area operation device 102 and should perform the performance operation for the notes through the performance operation device 103 at the time in which positions of the notes are identical to positions of the determination targets.

FIGS. 9A and 9B are examples illustrating the displays of various kinds of notes (a turntable note, and a sampler note) and the performance operation for the various kinds of notes.

As an example, the notes in the present invention may include the "sampler note", for which the performance operation can be performed through the performance operation device 103 after setting the activation track area according to the movement operation of the activation track area through the track area operation device 102, and the "turntable note 900" for which the performance operation can be performed only by the movement operation of the activation track area through the track area operation device 102 without the performance operation through the performance operation device 103 by the user. In FIGS. 9A and 9B, a first note, a third note, and a fourth note correspond to the sampler note, and a second note corresponds to the turntable note. The sampler note has a width identical to a width of a corresponding track. However, the turntable note 900 has a width identical to a width of a corresponding track area. Further, in an aspect of a length, the turntable note 900 has a length longer than a length of the sampler note.

With reference to FIGS. 9A to 9B for the description of a performance method of the turntable note 900, when the first note of the second track area approaches the determination target in FIG. 9A, the second track area, which is the default track area, is set as the activation track area by not operating the track area operation device 102 and then the performance operation for the first note can be performed by operating the performance operation device 103 at the time in which a position of the first note is identical to a position of the determination target.

With reference to FIG. 9B illustrating a subsequent game screen, the second note approaches the determination target and the second note may include a head part and a body part since the second note is the turntable note 900. The performance operation for the second note can be performed by continuously operating the track area operation device 102 in a left direction at the time in which a head part (lower part) of the second note reaches the determination target. At this time, the operation of the track area operation device 102 in the left direction should be continuously performed from the point when the head part (lower part) of the second note reaches the determination target to a point before the body part (upper part) of the second note escapes from the determination target. The head part (lower part), which may have a length (height) similar to a length (height) of the determination target, of the turntable note 900 can be displayed to distinguish from the body part (upper part) through a shading processing of the head part. Therefore, it is easy to recognize a case where the position of the head part (lower part) of the turntable note 900 is exactly identical to the position of the determination target.

Further, with reference to FIG. 9B, when the third note and the fourth note which are the sampler notes reach the determination target while the second note which is the turntable note 900 is passing through the determination target, the user should play the third note and the fourth note by operating the performance operation device 103 simultaneously while continuously operating the track area operation device 102 in order to play the second note which is the turntable note 900 in the left direction.

Figure 10:
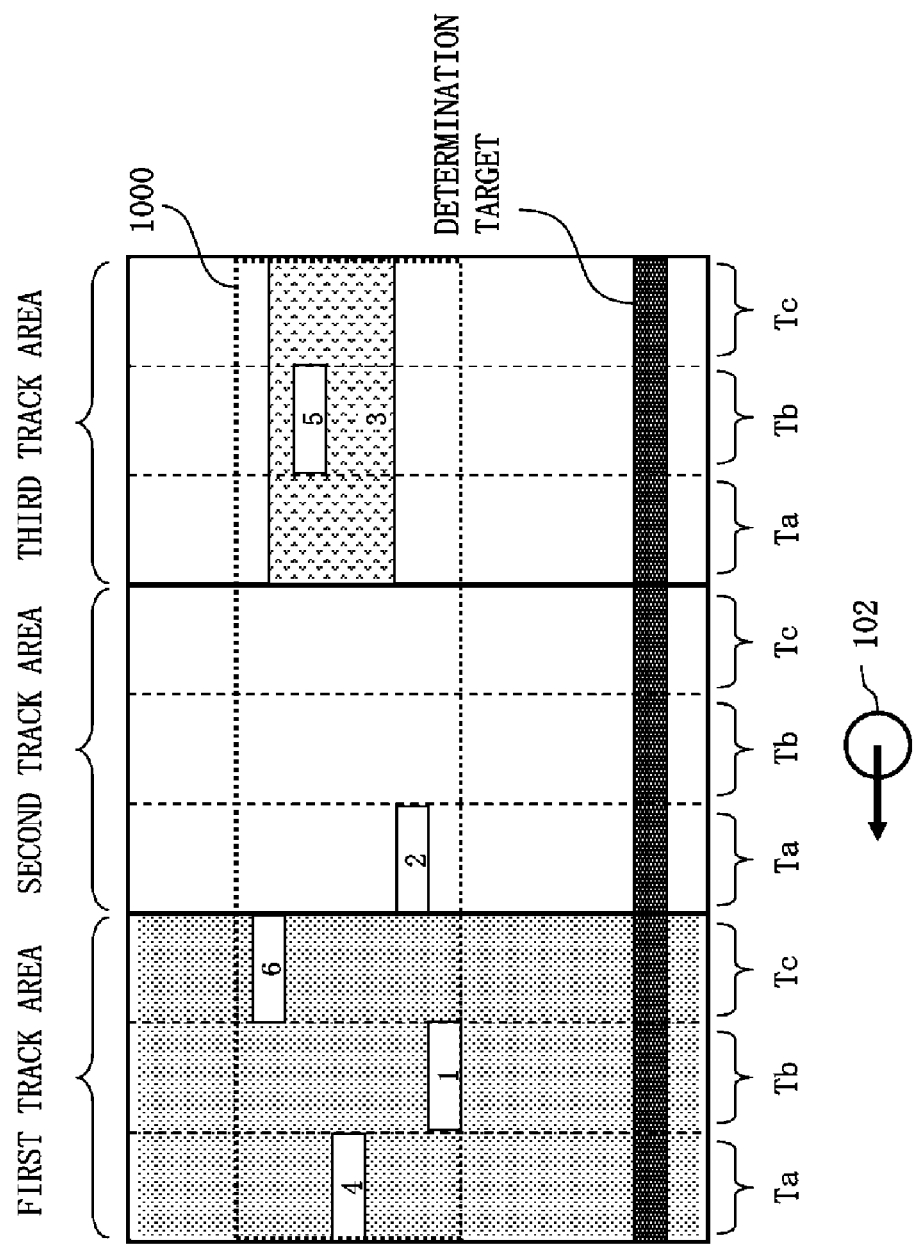
FIG. 10 is an example in which notes requiring the performance operation at a similar time in the plural track areas are displayed at the same time.

FIG. 10 is an example in which notes requiring the performance operations at the similar time in the plural track areas are displayed at the same time.

As shown in FIG. 10, when the notes (a first note, . . . , a fifth note), which should be played at the similar time, come down in three track areas (a first track area, a second track area, and a third track area) at the same time, quick judgment, a setting of quickly changing the activation track area, and quick performance operation are required in order to play all the notes. Therefore, a higher score can be given to the performance operation for the difficult note pattern. Further, when the difficult note pattern is generated, a separate section indication 1000 can be provided. When the separate section indication is provided, upper parts and lower parts of the notes should not escape from the section indication 1000. Moreover, the situation (situation where notes, which should be played at a similar time, are displayed in the plural track areas at the same time) may be provided after the performance game is played many times.

FIGS. 11A to 15 are examples of various kinds of track area operation devices 102.

FIGS. 11A to 11B are examples of the track area operation device 102 implemented as an analog stick 1100.

With reference to FIG. 11A, the analog stick 1100 is located at the center because of its nature when there is no operation (input) by the user. When the user operates the analog stick 1100 by moving the analog stick 1100 in a left direction or a right direction, the operated direction within a range of the movement recognition is recognized and then a track area corresponding to the recognized direction is set as the activation track area.

There are two methods for setting the activation track area by using the analog stick 1100. First, when the user completely moves the analog stick 1100 as much as possible, a track area corresponding to the movement is set as the activation track area. Second, by setting inclination ranges of the analog stick 1100 in the left direction and the right direction, a track area is set as the activation track area according to the inclination of the analog stick 110. FIG. 11B illustrates a left operation state of the analog stick 1100 in which a left track area is set as the activation track area, a central state of the analog stick 1100 in which a central track area is set as the activation track area or an operation state of the analog stick 1100 corresponding to the central state, and a right operation state of the analog stick 1100 in which a right track area is set as the activation track area.

Figure 12:
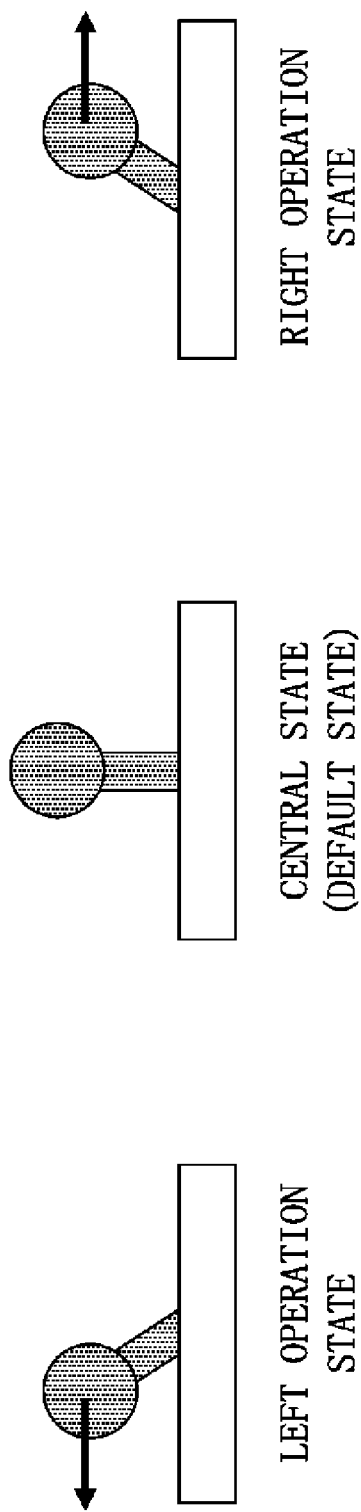

FIG. 12 is an example of the track area operation device 102 implemented as a joystick 1200.

The joystick 1200 shown in FIG. 12 can be implemented more simply than the analog stick 1100 in FIG. 11. The joystick 1200 is in a central state (this state may be a default state) when the user does not operate the joystick 1200 so that a central track area is set as the activation track area (default track area). When the user leans the joystick 1200 in a left direction, a left track area corresponding to the operation of the user is set as the activation track area. In contrast, when the user leans the joystick 1200 in a right direction, a right track area corresponding to the operation of the user is set as the activation track area.

FIGS. 13A to 13B are examples of the track area operation device 102 implemented as a seesaw-type button 1300.

With reference to FIG. 13A, while the user is pressing buttons L, R, U, and D for four directions included in the seesaw-type button, a track area corresponding to the operation of the user is set as the activation track area.

As shown in FIG. 13B, when the user presses the button L for the left direction included in the seesaw-type button 1300, a left track area is set as the activation track area. When the user presses the button R for the right direction included in the seesaw-type button 1300, a right track area is set as the activation track area. When the user does not operate the seesaw-type button 1300, a central track area, which is the default track area, is set as the activation track area.

The seesaw-type button 1300 is structurally implemented so that complete opposite inputs cannot be performed at the same time. That is, since the seesaw-type button 1300 has the integrated buttons L, R, U, and D for four directions, the user cannot press the button for left direction L and the button for right direction R at the same time.

FIG. 14 is examples of the track area operation device 102 implemented as buttons 1410 and 1420 capable a plurality of simultaneous inputs.

As shown in FIG. 14, since the buttons 1410 and 1420 capable of the plural simultaneous inputs have separate buttons for four directions L, R, U, and D or separate buttons for two directions L and R, the user can press the buttons for each direction at the same time. The simultaneous inputs can generate errors in setting the activation track area according to operation directions so that the simultaneous inputs are divided into the following cases and then processed corresponding to the cases.

In a state of changing the setting of the activation track area by pressing a button for one direction, when the user presses a button for another direction, a track area corresponding to another direction is immediately set as the activation track area.

Further, in a state of changing the setting of the activation track area by pressing a button for one direction, when the user presses a button for another direction and takes his/her hand off the button which the user has been pressing so far, a track area corresponding to another direction is immediately set as the activation track area and no change is generated after taking his/her hand off the button.

Furthermore, since the people cannot press buttons exactly at the same time and there is a difference between timings of pressing the buttons, it is impossible to press buttons for two directions at the same time.

FIG. 15 is examples of the track area operation device 102 implemented as touch devices 1510, 1520, and 1530.

With reference to FIG. 15, the touch devices 1510, 1520, and 1530 display track area operation indications and the track area operation indications can be operated by the direct touch.

As shown in FIG. 15, the touch devices 1510, 1520, and 1530 can be implemented as various shapes. Since the operation by touching the center and then dragging to the left or the right cannot be rapidly performed, the touch devices enable the inputs to the left and the right to be rapidly performed like a button input method. Further, the touch devices 1510, 1520, and 1530, by which multi touches are possible, can process the simultaneous inputs of the buttons 1410 and 1420 capable of the plural simultaneous inputs.

FIG. 16 is examples of the performance operation device 103.

With reference to FIG. 16, the performance operation device 103 includes four operation buttons L, R, U, and D having a diamond shape or four operation buttons 1, 2, 3, and 4 having a linear shape. FIG. 16 illustrates the performance operation device 103 including the four operation buttons, but the performance operation device 103 may include one to three operation buttons or five or more operation buttons, instead of the four operation buttons. Further, the performance game apparatus 100 may include two or more performance operation devices 103, wherein each of the performance operation devices has one or more operation button sets.

In the following description, a method of the performance game provided by the performance game apparatus 100 according to an embodiment of the present invention will be discussed.

The method of the performance game provided by the performance game apparatus 100 according to an embodiment of the present invention includes a game screen display control step of constructing the performance game on the game screen and providing the game screen, an activation track area setting step of setting the activation track area for performing the performance operation for notes in a specific track area, a performance operation step of performing the performance operation for the notes in the specific track area set as the activation track area by the user, a performance operation determination step of determining the performance operation of the user, and a performance operation determination result provision step of providing a result of determining the performance operation.

The game screen display control step constructs the game screen in such a manner that a plurality of track areas are displayed in the game screen and the notes move toward positions where the determination targets are located in each of the plural track areas, and then provides the user with the constructed game screen.

The activation track area setting step sets the activation track area for performing the performance operation for the notes in the specific track area. Specifically, the activation track area setting step sets one track area (specific track area) of the plural track areas as the activation track area according to the activation track area movement operation of the user.

The performance operation step performs the performance operation of the user, and specifically, the performance operation step recognizes the generation of the performance operation signal according to the performance operation of the user.

The performance operation determination step determines the performance operation of the user in the performance operation step. Specifically, when the generation of the performance operation signal is recognized, the performance operation determination step compares positions of the notes with positions of the determination targets in the track area set as the activation track area to determine the accuracy of the performance operation in the performance operation step.

The performance operation determination result provision step provides a result of determining the performance operation by displaying the determination result as a score according to the accuracy determined in the performance operation determination step or expressing the determination result as an expression effect or a specific tone.

Only while a specific direction for the activation track area movement operation is continuously recognized by operating the track area operation device 102 in the specific direction, the activation track area setting step sets one of the plural track areas as the activation track area according to the recognized direction and then maintains the activation track area. When the user stops the activation track area movement operation by which the user has maintained and operated the track area operation device 102 in the specific direction, the track area operation device 102 automatically returns to a default position (e.g. central position) or a default state (e.g. central state) and the default track area is automatically set as the activation track area.

In the following description, a performance game method in a state where the performance operation for notes in a specific track area is performed will be discussed with reference to the flowchart of FIG. 17.

Figure 17:
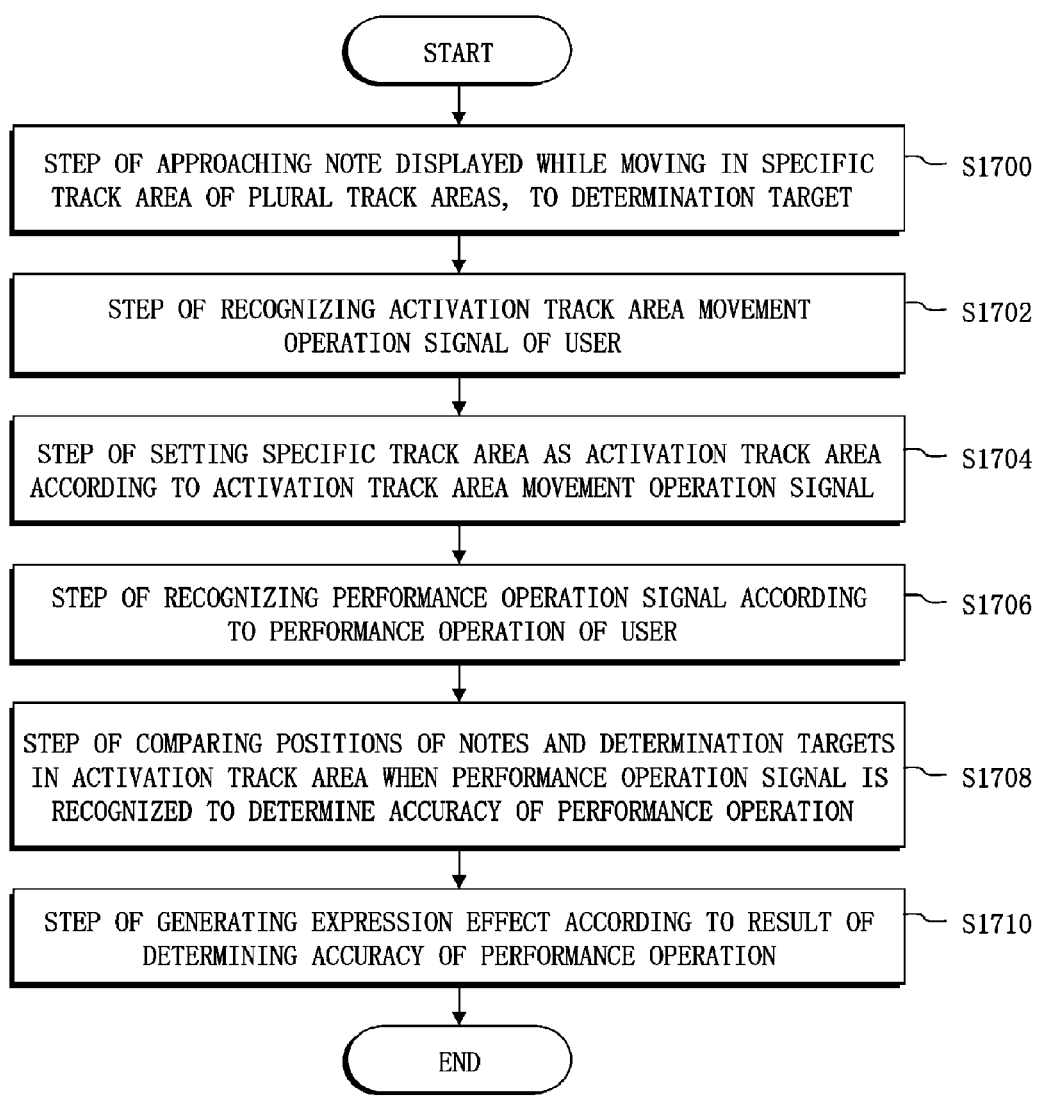
FIG. 17 is a flowchart of a performance game method according to an embodiment of the present invention.

With reference to FIG. 17, the performance game method according to an embodiment of the present invention includes approaching the notes displayed while moving in the specific track area among the plural track areas, to the determination targets S1700, recognizing the activation track area movement operation signal of the user S1702, setting the specific track area as the activation track area according the activation track area movement operation signal S1704, recognizing the performance operation signal according to the performance operation of the user when the user performs the performance operation for playing the notes in the specific track area of S1700 S1706, determining the accuracy of the performance operation by comparing positions of the notes and the determination targets in the activation track area S1708, and generating an expression effect according to a result of determining the accuracy of the performance operation S1710.

S1702 detects a specific direction from the recognized the activation track area movement operation signal. S1704 sets a specific track area corresponding to the specific direction as the activation track area and maintains the set activation track area only while the specific direction is continuously detected in S1702.

When the activation track area movement operation signal is not recognized so that the detection of the specific direction is stopped in S1702, S1704 sets a preset default track area among the plural track areas as the activation track area by returning the preset default track area to the activation track area. Therefore, S1708 considers and determines the performance operation in S1706 as the performance operation for the notes in the preset default track area set as the activation track area by returning the preset default track area to the activation track area.

The performance game method according to an embodiment of the present invention described above is implemented by a program and can be recoded in a computer readable recording medium.

A program, which is recoded in a recording medium for implementing the performance game method according to an embodiment of the present invention, displays the plural track area on the game screen, and implements functions of controlling notes such that the notes are displayed while moving toward positions where the determination targets are located for each of the plural track areas, of setting one of the plural track areas as the activation track area according to the movement operation of the activation track area of the user, and of determining the accuracy of the performance operation by comparing positions of the notes and the determination targets in the track area set as the activation track area when the signals of the performance operation are generated according to the performance operation of the user.

The computer readable recording medium may include, for example, a ROM, a RAM, a CD-ROM, a magnetic tape, a floppy disk, and an optical data storage device. In addition, the computer readable recording medium is distributed to computer systems connected to a network so that the computer readable recording medium can store and execute computer readable codes by a distributed method.

Further, a functional program, a code, and code segments for implementing an embodiment of the present invention can be easily conceived by a programmer in the technical field of the present invention.

FIG. 18 is a block diagram of the performance game apparatus 1800 according to another embodiment of the present invention.

As shown in FIG. 18, the performance game apparatus 1800 according to another embodiment of the present invention includes a display 1810 for displaying the plural track areas including one or more tracks and displaying notes moving toward positions of the determination targets in each of the tracks of the plural track areas, a track area operation device 1820 for setting one of the plural track areas as the activation track area according to the movement operation of the activation track area of the user, and a performance operation device 1830 including one or more operation buttons for performing the performance operation of the user for the track area set as the activation track area.

When the movement operation of the activation track area by the user is not performed or ceases, the track area operation device 1820 maintains a default state (e.g. central state) or a default position (e.g. central position) corresponding to a preset default track area among the plural track areas or automatically returns to the default state or the default position. The track area operation device 1820 can be implemented as one of the analog stick 110, the joystick 1200, the seesaw-type button 1300, the buttons 1410 and 1420 which can perform the plural simultaneous inputs, and the touch devices 1510, 1520, and 1530 shown in FIGS. 11 to 15.

The aforementioned performance game apparatus 1800 according to another embodiment of the present invention may be an arcade game machine, which can be used in a game room, portable game machines such as Play Station Portable (PSP), a Personal Digital Assistant (PDA), and a Portable Media Player (PMP), portable terminals such as a smart phone and a mobile communication terminal, or computers such as a desktop computer and a laptop computer. FIG. 19 is an example of the performance game apparatus 1800 implemented as the portable game machine.

With reference to FIG. 19, when four operation buttons included in the performance operation device 1830 are insufficient to play the game, the user can use preliminary performance operation device 1840. When the specific track area includes five or more tracks, the four operation buttons included in the performance operation device 1830 are insufficient to play the five or more tracks in the specific track area so that the user uses the operation buttons included in the preliminary performance operation device 1840.

Further, with reference to FIG. 19, the performance game apparatus 1800 may further include a central processing unit 1840, a memory 1850, and a speaker 1860.

The central processing unit 1840 controls a construction of the game screen displayed in the display 1810, receives an activation track area movement operation signal from the track area operation device 1820 to change and set the activation track area, controls track area indications displayed in the display 1810 according to the setting, receives a performance operation signal from the performance operation device 1830 to determine the performance operation, and can display a determination result in the display 1810 or output an expression effect sound or a specific tone through the speaker 1860. That is, the game screen controller 110, the track area controller 120, and the performance operation controller 130, which may be software modules shown in FIG. 1, can be implemented through the central processing unit 1840.

Further, the memory 1850 stores data for various kinds of music, and can store various kinds of information or data related to the performance game. Furthermore, the memory 1850 can store data with regard to a game result such as the determination result or the score generated by the performance game.

Figure 20:
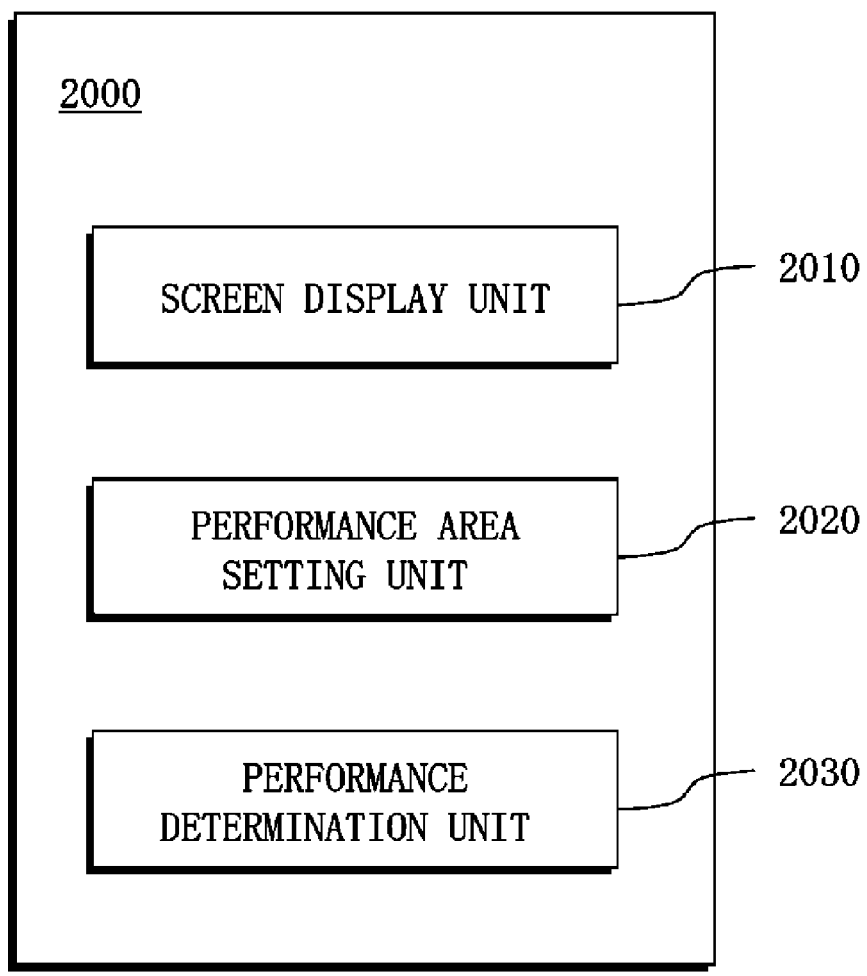
FIG. 20 is a block diagram of the performance game apparatus according to another embodiment of the present invention.

FIG. 20 is a block diagram of the performance game apparatus 2000 according to another embodiment of the present invention.

With reference to FIG. 20, the performance game apparatus 2000 according to another embodiment of the present invention includes a screen display unit 2010 for displaying a plurality of areas including one or more tracks in the game screen for the performance game and displaying fixed indicators and moving indicators moving along the tracks in the displayed areas, a performance area setting unit 2020 for setting one of the plural areas as a performance area, and a performance determination unit 2030 for determining the success/error or the accuracy of the performance operation for the fixed indicators and the moving indicators by comparing positions of the fixed indicators and the moving indicators in the area set as the performance area at the time in which the performance operation of the user is generated.

The performance area setting unit 2020 sets one of the plural areas as the performance area and maintains the set performance area only while the operation of the user is continuously maintained. If the operation of the user is not performed or the maintained operation ceases, the performance area is set as a preset default area among the plural areas by returning the performance area to the preset default area.

The performance game provided by the performance game apparatus 2000 according to an embodiment of the present invention shown in FIG. 20 may be a performance game implemented by a note movement method and a timeline movement method. The performance game implemented by the two methods will be described with reference to FIGS. 21A and 21B.

Figure 21:
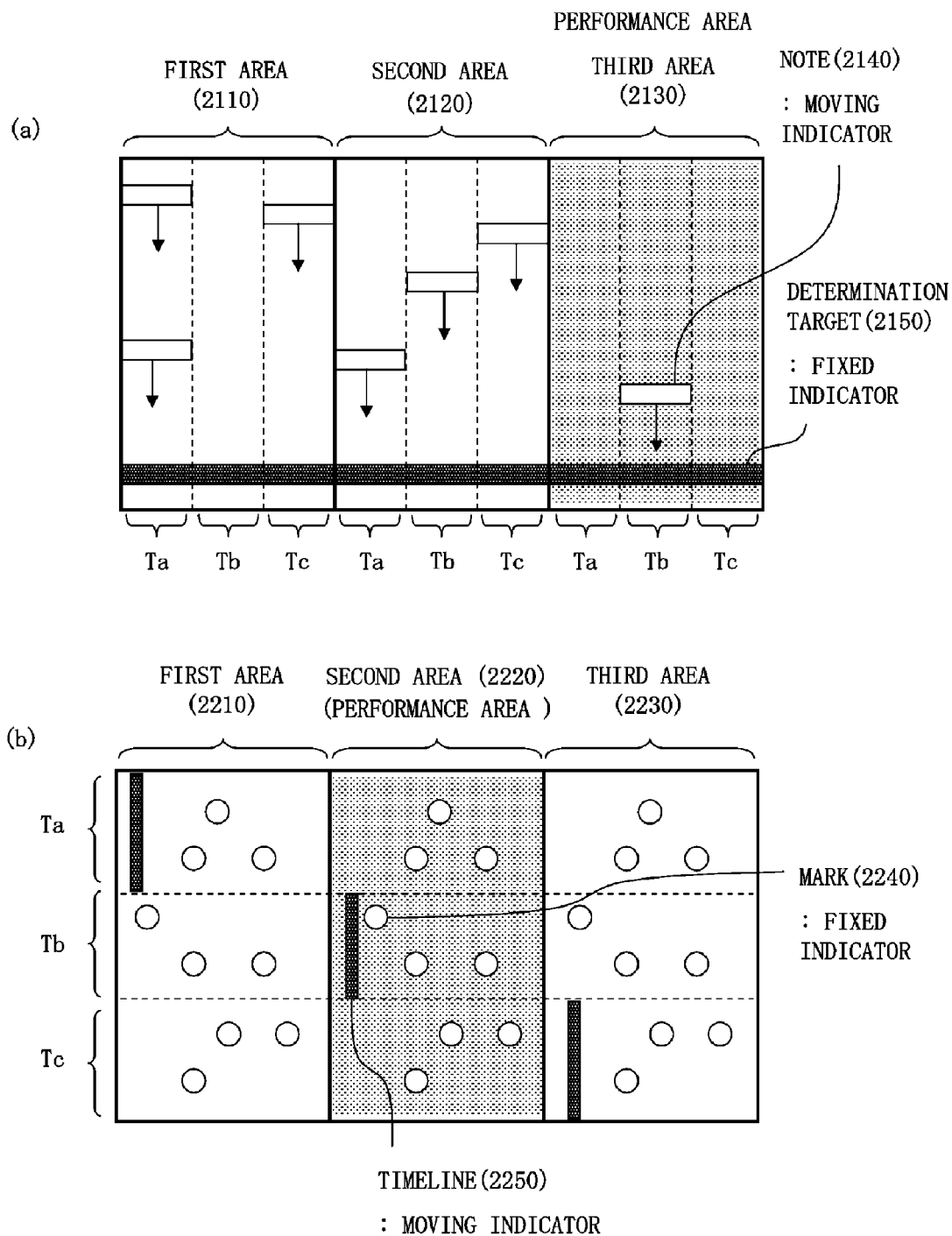
FIGS. 21A to 21B are examples illustrating two types of the performance game provided to the performance game apparatus according to another embodiment of the present invention.

With reference to FIG. 21A, the performance game of the note movement method corresponds to the performance game described with reference to FIGS. 1 to 19 and the note movement method is a method in which the notes 2140 displayed while moving along each of the tracks in the plural areas are displayed as the moving indicators and the determination target 2150 is displayed as the fixed indicator.

With reference to the game screen shown in FIG. 21A, the performance game of the note movement method displays the game screen by dividing the game screen into a plurality of areas including a first area 2110, a second area 2120, and a third area 2130. Each of the areas includes three tracks Ta, Tb, and Tc, in which the notes 2140 which are the moving indicators move, and the determination target 2150, which is the fixed indicator, is displayed in an end (lower end) of each area. The performance game is implemented by a method in which the notes 2140, which are the moving indicators, are displayed while moving toward the determination target 2150, which is the fixed indicator, located at an end of each of the tracks Ta, Tb, and Tc, and the user performs the performance operation for the notes 2140, which are the moving indicators, at the time in which the user determines that the positions of the moving notes 2140 are identical to the position of the determination target 2150, to determine whether the positions of the notes 1240 are exactly identical to the position of the determination target 1250 at the time in which the performance operation is performed. In order to play the corresponding note 2140, which is the moving indicator, the user should perform the performance operation after setting the area (corresponding to the track areas in FIGS. 1 to 19), in which the corresponding note 2140 is located, as the performance area (corresponding to the activation track area in FIGS. 1 to 19).

With reference to the game screen shown in FIG. 21B, the performance game of the timeline movement method uses a method in which the timelines 2250 moving along the tracks in the plural areas are displayed as the moving indicators and marks 2240 in the plural areas are displayed as the fixed indicators.

With reference to FIG. 21B, the performance game of the timeline movement method displays the marks 2240 indicating points of expression operation in each of a first area 2210, a second area 2220, and a third area 2230. In the performance game of the timeline movement method, the time lines 2250 in the areas 2210, 2220, and 2230 pass the marks 2240 displayed in the areas 2210, 2220, and 2230, and the user performs the performance operation for the marks 2240, which are the fixed indicators, at the time in which positions of the marks 2240, which are the fixed indicators, are identical to positions of the timelines 2250, which are the moving indicators. In order to play a corresponding mark 2240 which is the fixed indicator, the user should perform the performance operation after setting the area (corresponding to the track areas in FIGS. 1 to 19), in which the corresponding mark 2240 is located, as the performance area (corresponding to the activation track area in FIGS. 1 to 19).

Accordingly, the present invention can provide the performance game for playing the indicators in a plurality of areas while the user moves in corresponding areas.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardware. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for a performance game, comprising:
a game screen controller for displaying a plurality of track areas in a game screen, and controlling notes in such a manner that the notes are displayed for each of the plurality of track areas while moving toward a position where determination targets are located;
a track area controller for setting one track area of the plurality of track areas as an activation track area according to an activation track area movement operation of a user; and
a performance operation controller for comparing positions of the notes and the determination targets in the track area set as the activation track area to determine accuracy of a performance operation when a performance operation signal is generated according to a performance operation of the user,
wherein the track area controller recognizes a direction for the activation track area movement operation and sets one track area of the plurality of track areas as the activation track area according to the recognized direction, and
wherein the track area controller sets one track area of the plurality of track areas as the activation track area according to the recognized direction for the activation track area movement operation and maintains the set activation track area while the direction is continuously recognized, and sets a predefined default track area of the plurality of track areas as the activation track area when the direction for the activation track area movement operation is not recognized or the direction continuously recognized for the movement operation of the activation track area is not recognized any longer.

2. The apparatus as claimed in claim 1, wherein the game screen controller displays the game screen in such a manner that the track area set as the activation track area among the plurality of track areas is distinguished from other track areas.

3. The apparatus as claimed in claim 1, wherein each of the plurality of track areas includes one or more tracks.

4. The apparatus as claimed in claim 3, wherein the notes displayed for each of the plurality of track areas includes one or more of a turntable note, for which the performance operation is possible only by the activation track area movement operation, and a sampler note, for which the performance operation is possible after the activation track area is set according to the activation track area movement operation.

5. The apparatus as claimed in claim 1, wherein the game screen controller displays the determination targets in all the plurality of track areas or displays the determination targets only in the track area set as the activation track area.

6. The apparatus as claimed in claim 1, wherein the track area controller includes a track area operation device by which the activation track area movement operation can be performed in two or more directions.

7. The apparatus as claimed in claim 6, wherein the track area operation device is in a default state or is located in a default position when the activation track area movement operation is not performed by the user, and is in an operation state or is located in an operation position only when the activation track area movement operation is maintained by the user.

8. The apparatus as claimed in claim 6, wherein the track area operation device is one of an analog stick, a joystick, a seesaw-type button, a button capable of a plurality of simultaneous inputs, and a touch device.

9. The apparatus as claimed in claim 1, further comprising a plurality of performance operation devices for separately performing the performance operation for each of the plurality of track areas, or one performance operation device for performing the performance operation for the plurality of track areas in common.

10. The apparatus as claimed in claim 9, wherein each of the plurality of performance operation devices or the one performance operation device includes an operation button corresponding to each of the tracks included in the plurality of track areas.

11. The apparatus as claimed in claim 1, wherein, when the track area set as the activation track area includes a plurality of tracks, although the performance operation signal is generated in the operation button corresponding to one track included in the track area set as the activation track area, the performance operation controller compares positions of the notes moving along other tracks included in the track area set as the activation track area with positions of the determination targets to determine the accuracy of the performance operation.

12. The apparatus as claimed in claim 1, wherein the performance operation controller determines the accuracy of the performance operation and gives a score according to the determined accuracy in such a manner as to give different scores for each of the plurality of track areas or give different scores according to patterns of the notes.

13. The apparatus as claimed in claim 1, wherein the performance operation controller generates an expression effect according to a result of determining the accuracy for the performance operation.

14. The apparatus as claimed in claim 1, wherein, for all the plurality of track areas or some specific track areas of the plurality of track areas, the game screen controller displays the notes as a pattern according to a reproduction flow of music, and the performance operation controller outputs partial tones of the music or expression effects corresponding to the notes in all the plurality of track areas or the some specific track areas after determining the accuracy of the performance operation for the note in all the plurality of track areas or the some specific track areas.

15. The apparatus as claimed in claim 14, wherein, for the track areas other than the some specific track areas, the game screen controller displays notes that are irrelevant to the reproduction flow of the music related to the pattern of the notes in the some specific track areas and the performance operation controller outputs tones and expression effects different from the partial tones and the expression effects output according to the performance operation for the notes in the some specific track areas after determining accuracy of the performance operation for the notes in the track areas other than the some specific track areas.

16. A computer-implemented method for a performance game, comprising the steps of:
  approaching notes, which are displayed while moving in a specific track area of a plurality of track areas, to determination targets;
  recognizing an activation track area movement operation signal of a user;
  setting the specific track area as the activation track area according to the activation track area movement operation signal;
  recognizing a performance operation signal according to the performance operation of the user;
  comparing positions of the notes and the determination targets at the time in which the performance operation signal is recognized to determine accuracy of the performance operation; and
  generating an expression effect according to a result of determining the accuracy of the performance operation,
  wherein the step of recognizing the activation track area movement operation signal comprises detecting a specific direction from the recognized activation track area movement operation signal, and the step of setting the specific track area as the activation track area comprises setting the specific track area corresponding to the specific direction as the activation track area and then maintains the set activation track area only while the specific direction is continuously detected, and
  wherein, when the detection for the specific direction is stopped in the step of recognizing the activation track area movement operation signal, the step of setting the specific track area as the activation track area comprises returning a preset default track area of the plurality of track areas to the activation track area and then setting the preset default track area as the activation track area and the step of determining the accuracy of the performance operation comprises considering and determining the performance operation in the step of setting the specific track area as the activation track area as the performance operation for the note in the default track area set as the activation track area so that the performance operation in the step of setting the specific track area as the activation track area is determined as an unsuccessful performance operation.

17. A non-transitory computer readable recording medium recording a program for executing a performance game method, the computer readable recording medium comprising the functions of:
  displaying a plurality of track areas in a game screen and controlling notes in such a manner that the notes are displayed for each of the plurality of track areas while moving toward a position where determination targets are located;
  setting one track area of the plurality of track areas as an activation track area according to an activation track area movement operation of a user; and
  comparing positions of the notes and the determination targets in the track area set as the activation track area to determine accuracy of a performance operation when a performance operation signal of the user is generated,
  wherein the step of recognizing the activation track area movement operation signal comprises detecting a specific direction from the recognized activation track area movement operation signal, and the step of setting the specific track area as the activation track area comprises setting the specific track area corresponding to the specific direction as the activation track area and then maintains the set activation track area only while the specific direction is continuously detected, and
  wherein, when the detection for the specific direction is stopped in the step of recognizing the activation track area movement operation signal, the step of setting the specific track area as the activation track area comprises returning a preset default track area of the plurality of track areas to the activation track area and then setting the preset default track area as the activation track area and the step of determining the accuracy of the performance operation comprises considering and determining the performance operation in the step of setting the specific track area as the activation track area as the performance operation for the note in the default track area set as the activation track area so that the performance operation in the step of setting the specific track area as the activation track area is determined as an unsuccessful performance operation.

18. An apparatus for a performance game, comprising:
  a display for displaying a plurality of track areas including one or more tracks and displaying notes moving toward positions where determination targets are located, along the plurality of track areas;
  a track area operation device for setting one track area of the plurality of track areas as an activation track area according to an activation track area movement operation of a user; and
  a performance operation device including one or more operation buttons for performing the performance operation of the user for the track area set as the activation track area,
  wherein, for all the plurality of track areas or some specific track areas of the plurality of track areas, the game screen controller displays the notes as a pattern according to a reproduction flow of music, and the performance operation controller outputs partial tones of the music or expression effects corresponding to the notes in all the plurality of track areas or the some specific track areas after determining the accuracy of the performance operation for the note in all the plurality of track areas or the some specific track areas, and for the track areas other than the some specific track areas, the game screen controller displays notes that are irrelevant to the reproduction flow of the music related to the pattern of the notes in the some specific track areas and the performance operation controller outputs tones and expression effects different from the partial tones and the expression effects output according to the performance operation for the notes in the some specific track areas after determining accuracy of the performance operation for the notes in the track areas other than the some specific track areas.

19. The apparatus as claimed in claim 18, wherein, when the activation track area movement operation of the user is not performed or ceases, the track area operation device is maintained in a default state or is located in a default position corresponding to a default track area among the plurality of track areas.

20. An apparatus for a performance game, comprising:
a screen display unit for displaying a plurality of areas including one or more tracks in a game screen for the performance game and displaying fixed indicators and moving indicators in the plurality of areas;
a performance area setting unit for setting one area of the plurality of areas as a performance area according to an operation of a user; and
a performance determination unit for comparing positions of the fixed indicators and the moving indicators in the area set as the performance area to determine an success or accuracy of the performance operation for the fixed indicators and the moving indicators,
wherein the track area controller recognizes a direction for the activation track area movement operation and sets one track area of the plurality of track areas as the activation track area according to the recognized direction, and
wherein the track area controller sets one track area of the plurality of track areas as the activation track area according to the recognized direction for the activation track area movement operation and maintains the set activation track area while the direction is continuously recognized, and sets a predefined default track area of the plurality of track areas as the activation track area when the direction for the activation track area movement operation is not recognized or the direction continuously recognized for the movement operation of the activation track area is not recognized any longer.

* * * * *